(12) United States Patent
Mukku et al.

(10) Patent No.: US 10,620,871 B1
(45) Date of Patent: Apr. 14, 2020

(54) STORAGE SCHEME FOR A DISTRIBUTED STORAGE SYSTEM

(71) Applicant: Robin Systems, Inc., San Jose, CA (US)

(72) Inventors: Jagadish Kumar Mukku, San Jose, CA (US); Kallur Vasudeva Rao Narasimha Subban, Cupertino, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 16/192,471

(22) Filed: Nov. 15, 2018

(51) Int. Cl.
*G06F 3/06* (2006.01)
*H04L 29/08* (2006.01)
*G06F 16/185* (2019.01)

(52) U.S. Cl.
CPC ............ *G06F 3/065* (2013.01); *G06F 3/0604* (2013.01); *G06F 3/067* (2013.01); *G06F 3/0644* (2013.01); *G06F 3/0662* (2013.01); *G06F 16/185* (2019.01); *H04L 67/1097* (2013.01)

(58) Field of Classification Search
CPC ...... G06F 3/065; G06F 3/0604; G06F 3/0644; G06F 3/0662; G06F 3/067; G06F 12/00; G06F 13/00
See application file for complete search history.

(56) References Cited

U.S. PATENT DOCUMENTS

| | | | |
|---|---|---|---|
| 4,310,883 A | 1/1982 | Clifton | |
| 5,602,993 A | 2/1997 | Stromberg | |
| 6,014,669 A | 1/2000 | Slaughter | |
| 6,119,214 A | 9/2000 | Dirks | |
| 6,157,963 A | 12/2000 | Courtright, II | |
| 6,161,191 A | 12/2000 | Slaughter | |
| 6,298,478 B1 | 10/2001 | Nally | |
| 6,301,707 B1 | 10/2001 | Carroll | |
| 6,311,193 B1 | 10/2001 | Sekido | |
| 6,851,034 B2 | 2/2005 | Challenger | |
| 6,886,160 B1 | 4/2005 | Lee | |
| 6,895,485 B1 | 5/2005 | Dekoning | |
| 6,957,221 B1 | 10/2005 | Hart | |

(Continued)

FOREIGN PATENT DOCUMENTS

WO   WO2017008675   1/2017

OTHER PUBLICATIONS

Segment map.

(Continued)

*Primary Examiner* — Tuan V Thai
(74) *Attorney, Agent, or Firm* — David R. Stevens; Stevens Law Group

(57) ABSTRACT

An application executing on a first computing platform includes containers executing role instances. One or more logical storage volumes include segments allocated to the application and references in a mapping table. The mapping table indicates a tier ID corresponding to the computing platform on which each segment is located. A snapshot of the application may be restored on a second computing platform. The mapping table may be copied to the second computing platform and used without transferring segments from the first computing platform to the second computing platform. Reads will be routed to the first computing platform using the tier ID in the mapping table.

20 Claims, 20 Drawing Sheets

(56) References Cited

U.S. PATENT DOCUMENTS

| | | | |
|---|---|---|---|
| 7,096,465 | B1 | 8/2006 | Dardinski |
| 7,111,055 | B2 | 9/2006 | Falkner |
| 7,171,659 | B2 | 1/2007 | Becker |
| 7,246,351 | B2 | 7/2007 | Bloch |
| 7,305,671 | B2 | 12/2007 | Davidov |
| 7,461,374 | B1 | 12/2008 | Balint |
| 7,590,620 | B1 | 9/2009 | Pike |
| 7,698,698 | B2 | 4/2010 | Skan |
| 7,721,283 | B2 | 5/2010 | Kovachka |
| 7,734,859 | B2 * | 6/2010 | Daniel ................ G06F 9/45558 370/466 |
| 7,738,457 | B2 | 6/2010 | Nordmark |
| 7,779,091 | B2 | 8/2010 | Wilkinson |
| 7,797,693 | B1 | 9/2010 | Gustafson |
| 7,984,485 | B1 | 7/2011 | Rao |
| 8,037,471 | B2 | 10/2011 | Keller |
| 8,121,874 | B1 | 2/2012 | Guheen |
| 8,171,141 | B1 | 5/2012 | Offer |
| 8,219,821 | B2 | 7/2012 | Zimmels |
| 8,261,295 | B1 | 9/2012 | Risbood |
| 8,326,883 | B2 | 12/2012 | Pizzorni |
| 8,392,498 | B2 | 3/2013 | Berg |
| 8,464,241 | B2 | 6/2013 | Hayton |
| 8,505,003 | B2 | 8/2013 | Bowen |
| 8,527,544 | B1 | 9/2013 | Colgrove |
| 8,601,467 | B2 | 12/2013 | Hofhansl |
| 8,620,973 | B1 | 12/2013 | Veeraswamy |
| 8,666,933 | B2 | 3/2014 | Pizzorni |
| 8,745,003 | B1 | 6/2014 | Patterson |
| 8,782,632 | B1 | 7/2014 | Chigurapati |
| 8,788,634 | B2 | 7/2014 | Krig |
| 8,832,324 | B1 | 9/2014 | Hodges |
| 8,886,806 | B2 | 11/2014 | Tung |
| 8,909,885 | B2 | 12/2014 | Corbett |
| 8,966,198 | B1 | 2/2015 | Harris |
| 9,134,992 | B2 | 9/2015 | Wong |
| 9,148,465 | B2 | 9/2015 | Gambardella |
| 9,152,337 | B2 | 10/2015 | Kono |
| 9,167,028 | B1 | 10/2015 | Bansal |
| 9,280,591 | B1 | 3/2016 | Kharatishvili |
| 9,330,155 | B1 | 5/2016 | Bono |
| 9,336,060 | B2 | 5/2016 | Nori |
| 9,342,444 | B2 | 5/2016 | Minckler |
| 9,367,301 | B1 | 6/2016 | Serrano |
| 9,436,693 | B1 | 9/2016 | Lockhart |
| 9,521,198 | B1 | 12/2016 | Agarwala |
| 9,569,274 | B2 | 2/2017 | Tarta |
| 9,600,193 | B2 | 3/2017 | Ahrens |
| 9,619,389 | B1 | 4/2017 | Roug |
| 9,635,132 | B1 | 4/2017 | Lin |
| 9,667,470 | B2 | 5/2017 | Prathipati |
| 9,747,096 | B2 | 8/2017 | Searlee |
| 9,870,366 | B1 | 1/2018 | Duan |
| 9,892,265 | B1 | 2/2018 | Tripathy |
| 9,998,955 | B1 | 6/2018 | MacCarthaigh |
| 10,019,459 | B1 | 7/2018 | Agarwala |
| 10,042,628 | B2 | 8/2018 | Thompson |
| 10,061,520 | B1 | 8/2018 | Zhao |
| 10,191,778 | B1 | 1/2019 | Yang |
| 10,241,774 | B2 | 3/2019 | Spivak |
| 10,282,229 | B2 | 5/2019 | Wagner |
| 10,430,434 | B2 | 10/2019 | Sun |
| 2004/0153703 | A1 | 8/2004 | Vigue |
| 2004/0221125 | A1 * | 11/2004 | Ananthanarayanan ..................... G06F 3/0613 711/203 |
| 2005/0065986 | A1 | 3/2005 | Bixby |
| 2005/0216895 | A1 | 9/2005 | Tran |
| 2006/0085674 | A1 | 4/2006 | Ananthamurthy |
| 2007/0006015 | A1 | 1/2007 | Rao |
| 2007/0067583 | A1 | 3/2007 | Zohar |
| 2007/0260842 | A1 | 11/2007 | Faibish |
| 2007/0288791 | A1 | 12/2007 | Allen |
| 2008/0189468 | A1 | 8/2008 | Schmidt |
| 2008/0270592 | A1 | 10/2008 | Choudhary |
| 2009/0144497 | A1 | 6/2009 | Withers |
| 2009/0172335 | A1 | 7/2009 | Kulkarni |
| 2009/0307249 | A1 | 12/2009 | Koifman |
| 2010/0161941 | A1 | 6/2010 | Vyshetsky |
| 2010/0162233 | A1 | 6/2010 | Ku |
| 2010/0211815 | A1 | 8/2010 | Mankovskii |
| 2010/0274984 | A1 | 10/2010 | Inomata |
| 2010/0299309 | A1 | 11/2010 | Maki |
| 2010/0306495 | A1 | 12/2010 | Kumano |
| 2010/0332730 | A1 | 12/2010 | Royer |
| 2011/0083126 | A1 | 4/2011 | Bhakta |
| 2011/0188506 | A1 | 8/2011 | Arribas |
| 2011/0208928 | A1 | 8/2011 | Chandra |
| 2011/0246420 | A1 | 10/2011 | Wang |
| 2011/0276951 | A1 | 11/2011 | Narayanamurthy |
| 2012/0005557 | A1 * | 1/2012 | Mardiks ................ G06F 11/10 714/763 |
| 2012/0066449 | A1 | 3/2012 | Colgrove |
| 2012/0102369 | A1 | 4/2012 | Hiltunen |
| 2012/0216052 | A1 | 8/2012 | Dunn |
| 2012/0226667 | A1 | 9/2012 | Volvovski |
| 2012/0240012 | A1 | 9/2012 | Weathers |
| 2012/0265976 | A1 | 10/2012 | Spiers |
| 2012/0311671 | A1 | 12/2012 | Wood |
| 2012/0331113 | A1 | 12/2012 | Jain |
| 2013/0054552 | A1 * | 2/2013 | Hawkins ................ G06K 9/66 707/706 |
| 2013/0054932 | A1 | 2/2013 | Acharya |
| 2013/0339659 | A1 | 12/2013 | Bybell |
| 2013/0346709 | A1 | 12/2013 | Wang |
| 2014/0006465 | A1 | 1/2014 | Davis |
| 2014/0047263 | A1 | 2/2014 | Coatney |
| 2014/0047341 | A1 | 2/2014 | Breternitz |
| 2014/0047342 | A1 | 2/2014 | Breternitz |
| 2014/0058871 | A1 | 2/2014 | Marr |
| 2014/0059527 | A1 | 2/2014 | Gagliardi |
| 2014/0059528 | A1 | 2/2014 | Gagliardi |
| 2014/0108483 | A1 | 4/2014 | Tarta |
| 2014/0245319 | A1 | 8/2014 | Fellows |
| 2015/0046644 | A1 | 2/2015 | Karp |
| 2015/0067031 | A1 | 3/2015 | Acharya |
| 2015/0074358 | A1 | 3/2015 | Flinsbaugh |
| 2015/0112951 | A1 | 4/2015 | Jain |
| 2015/0134857 | A1 | 5/2015 | Hahn |
| 2015/0186217 | A1 | 7/2015 | Eslami |
| 2015/0326481 | A1 | 11/2015 | Rector |
| 2015/0379287 | A1 | 12/2015 | Mathur |
| 2016/0011816 | A1 | 1/2016 | Aizman |
| 2016/0042005 | A1 | 2/2016 | Liu |
| 2016/0124775 | A1 | 5/2016 | Ashtiani |
| 2016/0197995 | A1 | 7/2016 | Lu |
| 2016/0259597 | A1 | 9/2016 | Worley |
| 2016/0283261 | A1 | 9/2016 | Nakatsu |
| 2016/0357456 | A1 | 12/2016 | Iwasaki |
| 2016/0357548 | A1 | 12/2016 | Stanton |
| 2017/0060975 | A1 | 3/2017 | Akyureklier |
| 2017/0149843 | A1 | 5/2017 | Amulothu |
| 2017/0168903 | A1 | 6/2017 | Dornemann |
| 2017/0192889 | A1 | 7/2017 | Sato |
| 2017/0242719 | A1 | 8/2017 | Tsirkin |
| 2017/0244557 | A1 | 8/2017 | Riel |
| 2017/0244787 | A1 | 8/2017 | Rangasamy |
| 2017/0322954 | A1 | 11/2017 | Horowitz |
| 2017/0337492 | A1 | 11/2017 | Chen |
| 2017/0371551 | A1 | 12/2017 | Sachdev |
| 2018/0024889 | A1 | 1/2018 | Verma |
| 2018/0046553 | A1 | 2/2018 | Okamoto |
| 2018/0082053 | A1 | 3/2018 | Brown |
| 2018/0107419 | A1 | 4/2018 | Sachdev |
| 2018/0113625 | A1 | 4/2018 | Sancheti |
| 2018/0113770 | A1 | 4/2018 | Hasanov |
| 2018/0137306 | A1 | 5/2018 | Brady |
| 2018/0159745 | A1 | 6/2018 | Byers |
| 2018/0165170 | A1 | 6/2018 | Hegdal |
| 2018/0218000 | A1 | 8/2018 | Setty |
| 2018/0246745 | A1 | 8/2018 | Aronovich |
| 2018/0247064 | A1 | 8/2018 | Aronovich |
| 2018/0285353 | A1 | 10/2018 | Ramohalli |
| 2018/0329981 | A1 | 11/2018 | Gupte |

(56) References Cited

U.S. PATENT DOCUMENTS

| | | |
|---|---|---|
| 2018/0364917 A1 | 12/2018 | Ki |
| 2019/0065061 A1 | 2/2019 | Kim |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignatari |
| 2019/0156023 A1 | 5/2019 | Gerebe |
| 2019/0188094 A1 | 6/2019 | Ramamoorthi |
| 2019/0190803 A1 | 6/2019 | Joshi |
| 2019/0213085 A1 | 7/2019 | Alluboyina |
| 2019/0215313 A1 | 7/2019 | Doshi |
| 2019/0220315 A1 | 7/2019 | Vallala |

OTHER PUBLICATIONS

Fast and Secure Append-Only storage with Infinite Capacity, Zheng.
User Mode and Kernel Mode, Microsoft.
Implementing time critical functionalities with a distributed adaptive container architecture, Stankovski.
Precise memory leak detection for java software using container profiling, Xu.
Segment map, Feb. 4, 2019.
Fast and Secure Append-Only storage with Infinite Capacity, Zheng, Aug. 27, 2003.
User Mode and Kernel Mode, Microsoft, Apr. 19, 2017.
Precise memory leak detection for java software using container profiling, Xu, Jul. 2013.
Mogi et al., "Dynamic Parity Stripe Reorganizations for RAID5 Disk Arrays," 1994, IEEE, pp. 17-26.
Syed et al, "The Container Manager Pattern", ACM, pp. 1-9 (Year 2017).
Rehmann et al., "Performance of Containerized Database Management Systems", ACM, pp. 1-6 (Year 2018).
Awada et al, " Improving Resource Efficiency of Container-instance Clusters on Clouds", IEEE, pp. 929-934 (Year 2017).
Stankovski et al, "Implementing Time—Critical Functionalities with a Distributed Adaptive Container Architecture", ACM, pp. 1-5 (Year 2016).
Dhakate et al, "Distributed Cloud Monitoring Using Docker as Next Generation Container Virtualization Technology" IEEE, pp. 1-5 (Year 2015).
Crameri et al, "Staged Deployment in Mirage, an Integrated Software Upgrade Testing and Distribution System", ACM, pp. 221-236 (Year: 2007).
Cosmo et al, "Packages Upgrades in FOSS Distributions: Details and Challenges", ACM, pp. 1-5 (Year: 2008).
Burg et al, "Atomic Upgrading of Distributed Systems", ACM, pp. 1-5 (Year: 2008).
Souer et al, "Component Based Architecture for Web Content Management: Runtime Deployable Web Manager Component Bundles", IEEE, pp. 366-369 (Year: 2008).

* cited by examiner

| VSID 302 | WU 304 | Vol ID 306 | Slice ID 308 | SSID 310 | DO 326 | MO 328 | Tier ID 330 | UUID 332 |
|---|---|---|---|---|---|---|---|---|
| VSID 302 | WU 304 | Vol ID 306 | Slice ID 308 | SSID 310 | DO 326 | MO 328 | Tier ID 330 | UUID 332 |

Mapping Table 300

| LBA 336 | VSID 338 | DO 340 |
|---|---|---|
| LBA 336 | VSID 338 | DO 340 |
| LBA 336 | VSID 338 | DO 340 |
| LBA 336 | VSID 338 | DO 340 |

Block Map 334

Fig. 3

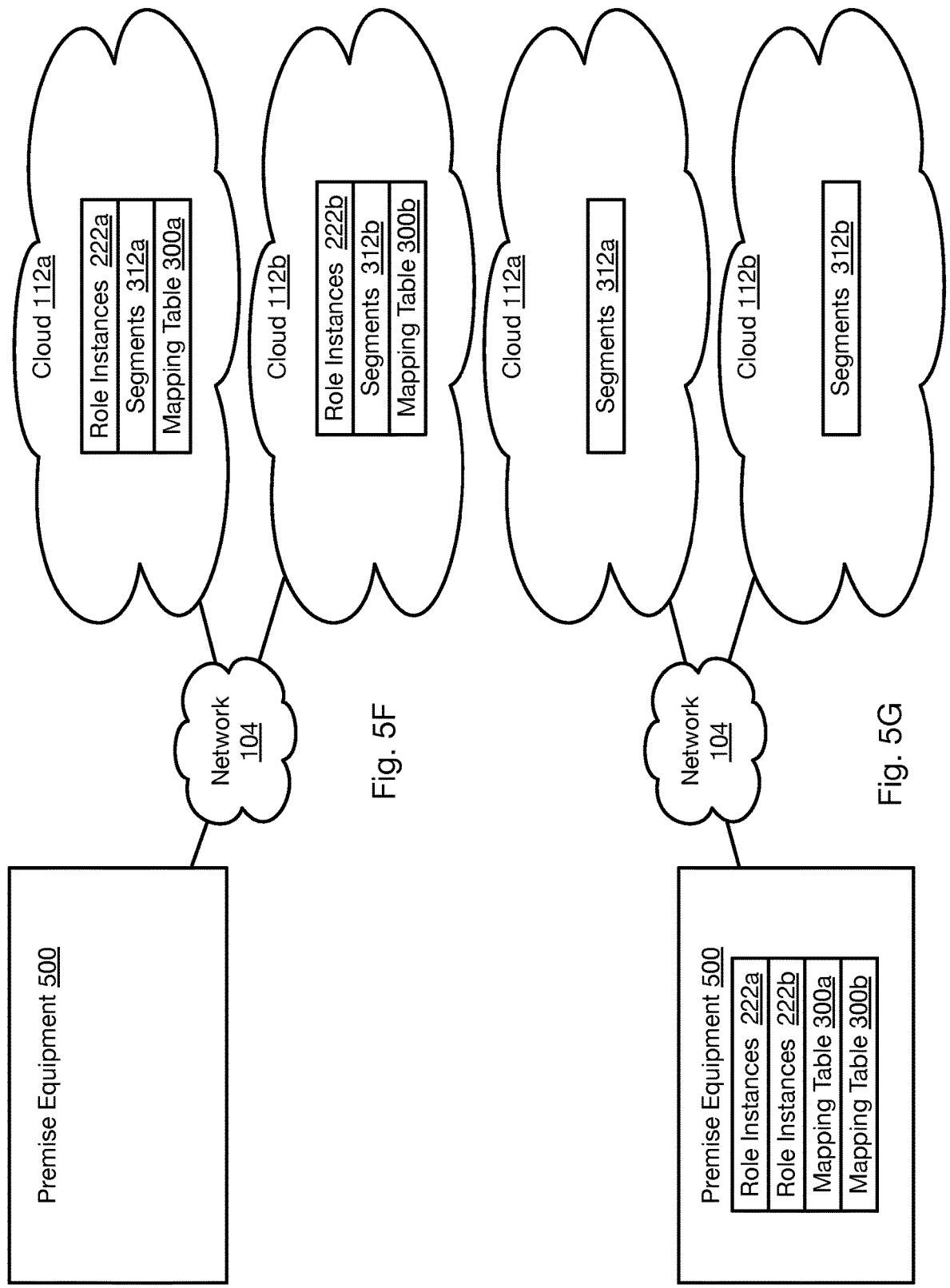

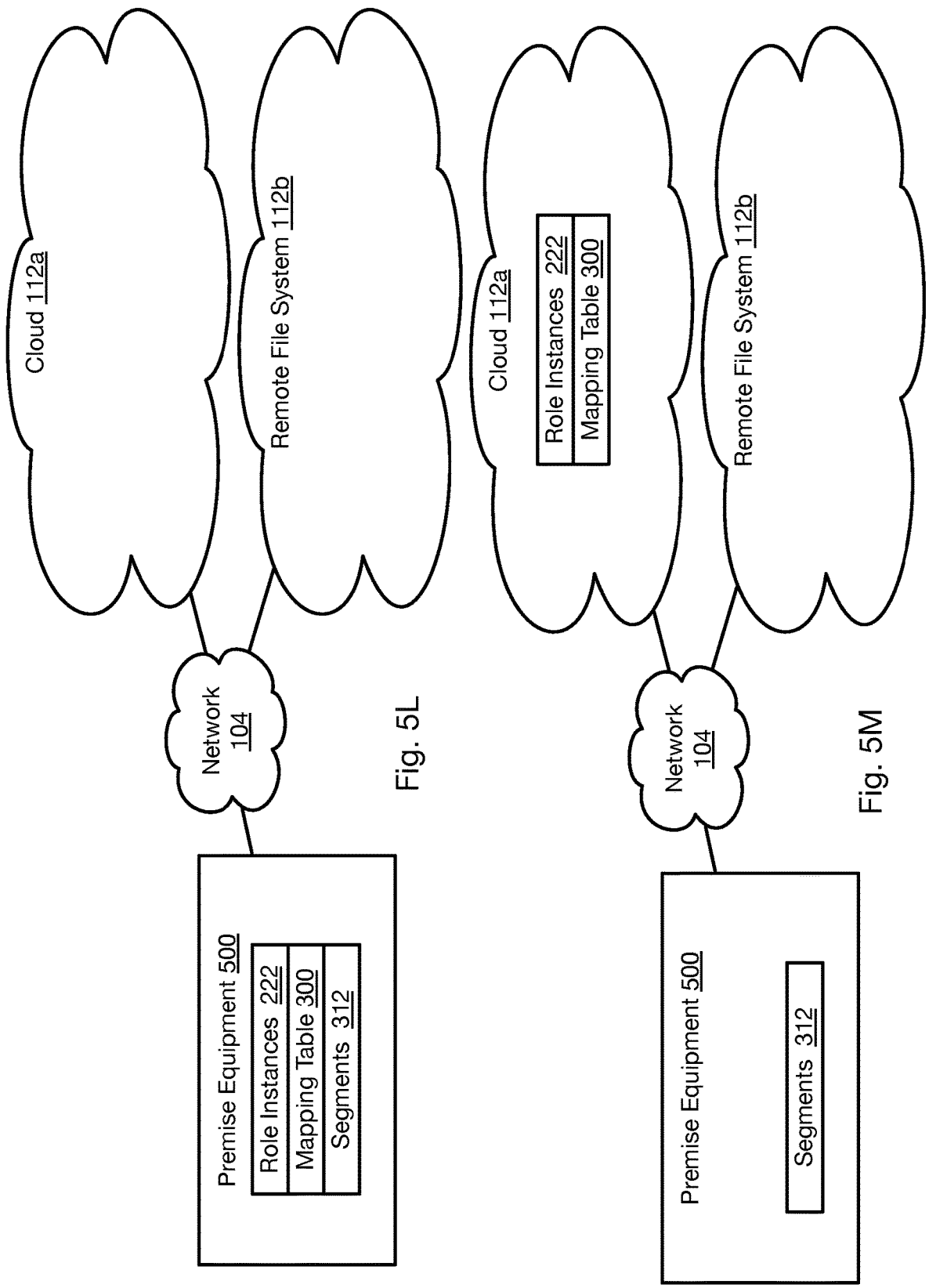

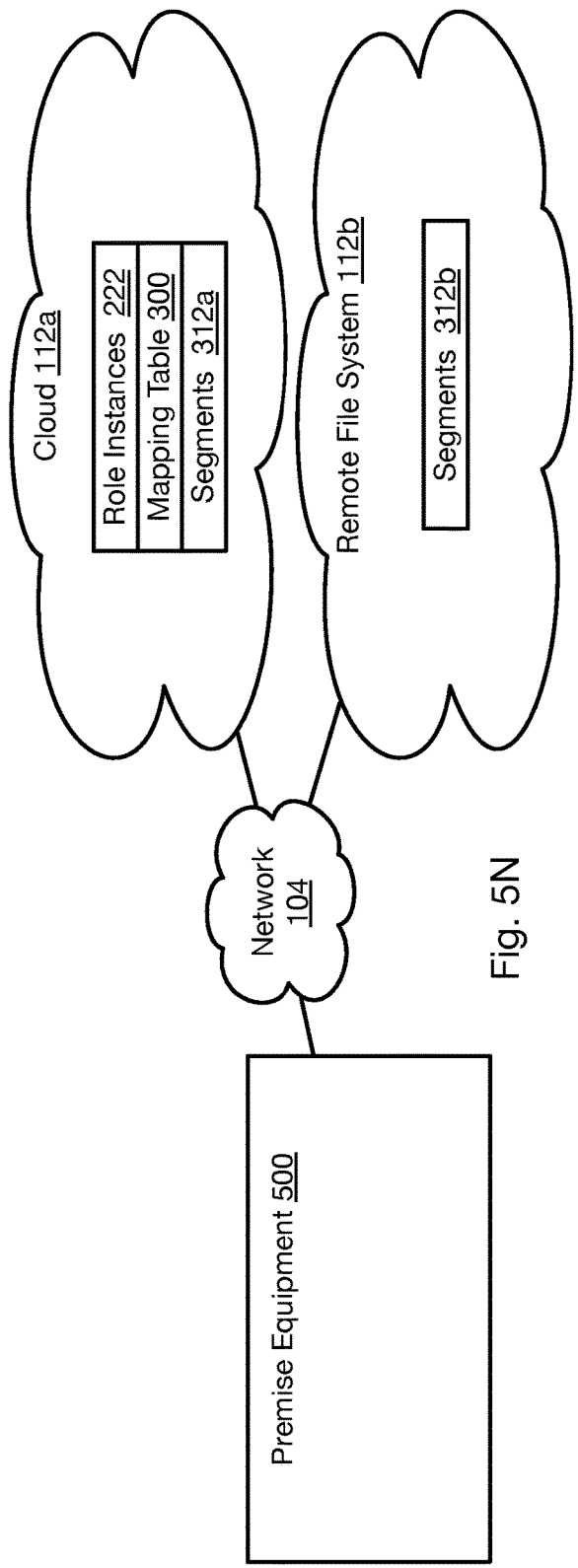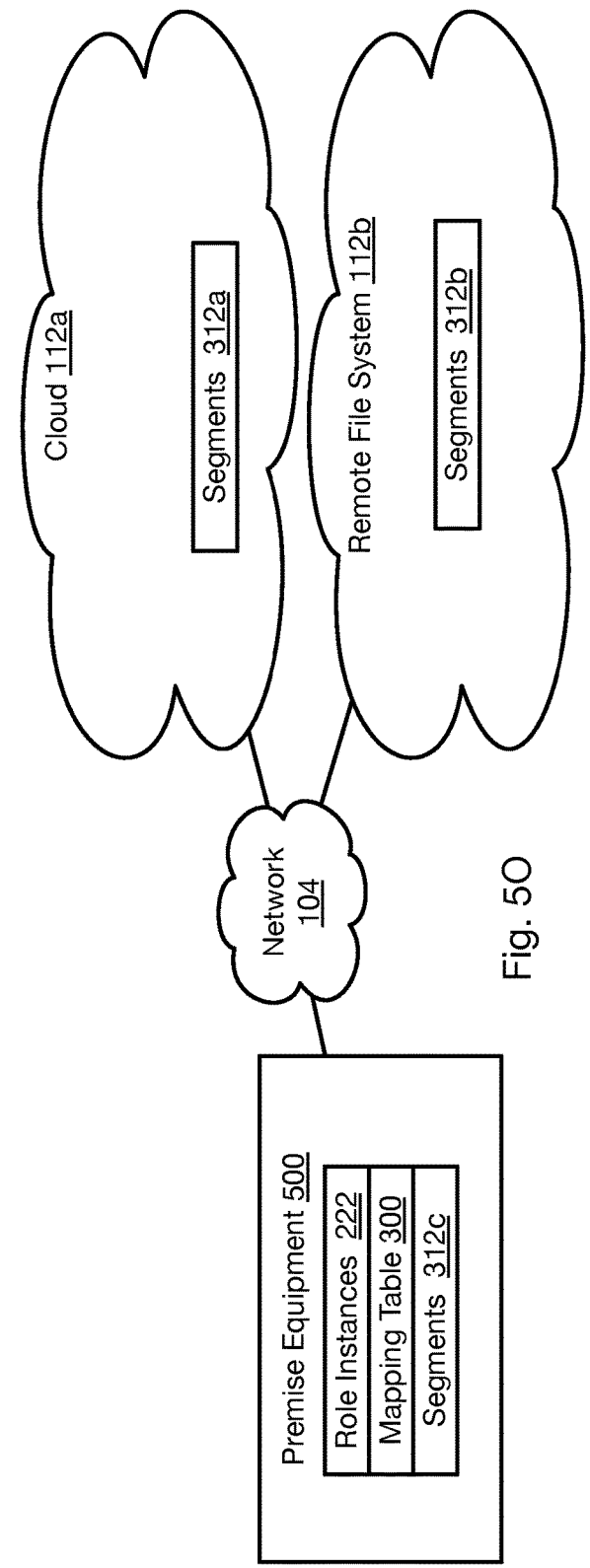

STORAGE SCHEME FOR A DISTRIBUTED STORAGE SYSTEM

BACKGROUND

Field of the Invention

This invention relates to storing and retrieving information in a distributed storage system.

Background of the Invention

An enterprise wishing to host and access large amounts of data has many options. The enterprise may implement its own data center with servers providing computing and storage for applications and possibly web servers for interacting with remote users. A more recent option is to implement one or both of computing and storage for an application in a cloud computing platform. Examples of these include Amazon Web Services (AWS), MICROSOFT AZURE, GOOGLE CLOUD, and others.

It would be an advancement in the art to enable an enterprise to utilize the computing platform of its choice to implement data-heavy applications.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 3 is a schematic diagram illustrating a mapping table in accordance with an embodiment of the present invention;

DETAILED DESCRIPTION

Figure 1:
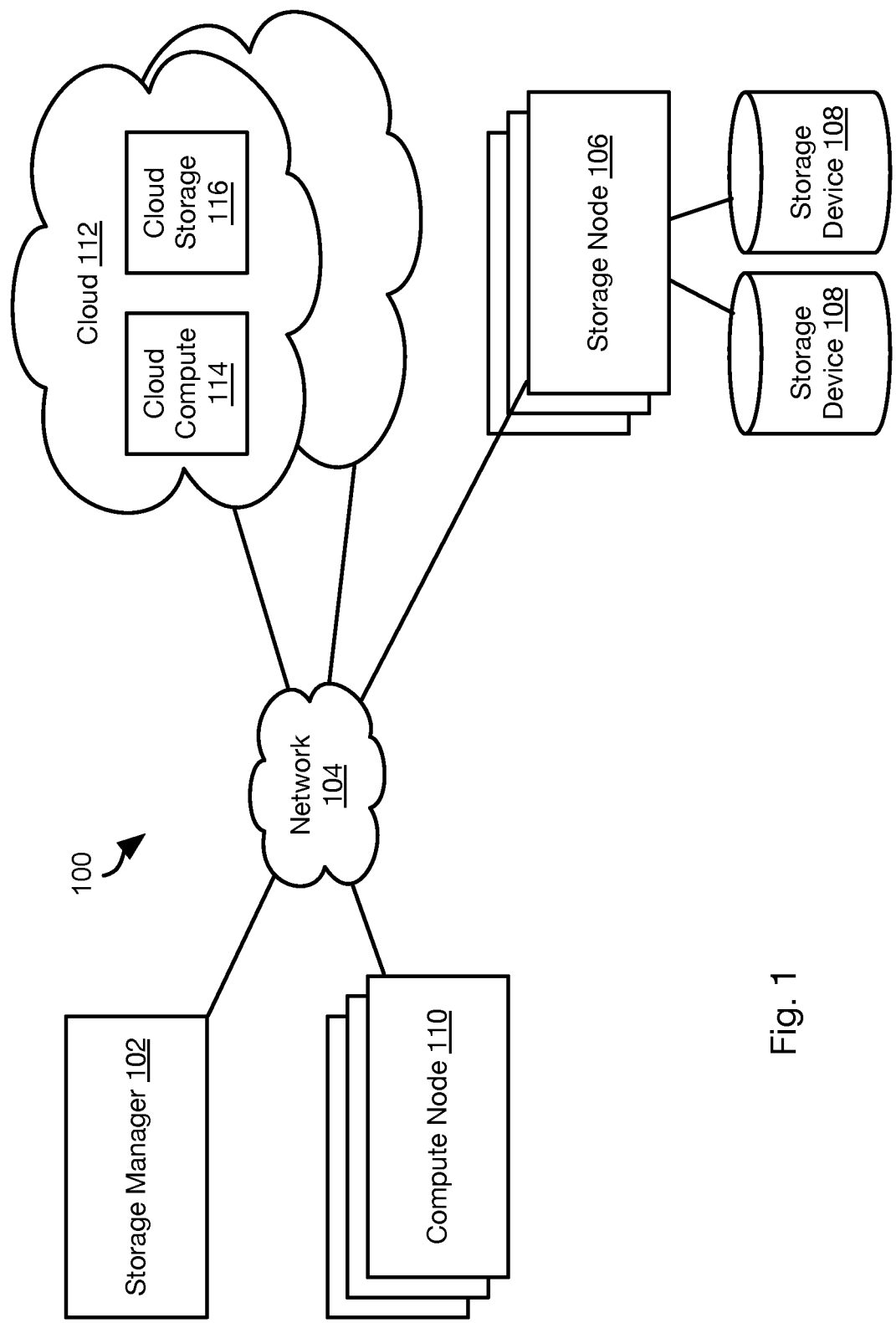
FIG. 1 is a schematic block diagram of a distributed storage system for implementing methods in accordance with an embodiment of the present invention.

Referring to FIG. 1, the methods disclosed herein may be performed using the illustrated distributed storage system 100. The distributed storage system 100 includes a storage manager 102 that coordinates the storage of data corresponding to one or more logical storage volumes. In particular, the storage manager 102 may be connected by way of a network 104 to one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the storage devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

In some embodiments, the network 104 may be coupled to one or more cloud computing platforms 112 such as Amazon Web Services (AWS), MICROSOFT AZURE, GOOGLE CLOUD, or the like. As known in the art, a cloud computing platform 112 may provide computing resources 114 (Elastic Cloud Computing (EC2) in AWS, Azure Virtual Machines, etc.) embodied as virtual machines that may be programmed to execute parts of applications. In some embodiments, a cloud computing platform 112 may provide only storage resources 116, such as a shared NFS (Network File System) or SMB (Server Message Block) file system.

A cloud computing platform 112 may further include cloud storage 116. This storage may be embodied as the Simple Storage Service (S3) of AWS, a managed disk in Azure, or other type of storage solution.

The manner in which the cloud computing resources 112 and cloud storage resources 114 are allocated, accessed, and managed may be according to any approach known in the art as implemented by the cloud computing platform 110.

As described in greater detail below, an application may execute on compute nodes 110 executing on a customer premise, on computing resources 114 of a cloud computing platform 112, or be distributed between these. Likewise, data for an application may be stored in storage nodes 106 on a customer premise, in the storage resources 116 of a cloud computing platform 112, or be distributed among these. Likewise, the data of an application may be distributed among the storage resources 116 of multiple different cloud computing platforms.

The storage manager 102 may execute anywhere within the illustrated system, such as on a compute node 110 or on computing resources 114 of a cloud computing platform 112.

Figure 2:
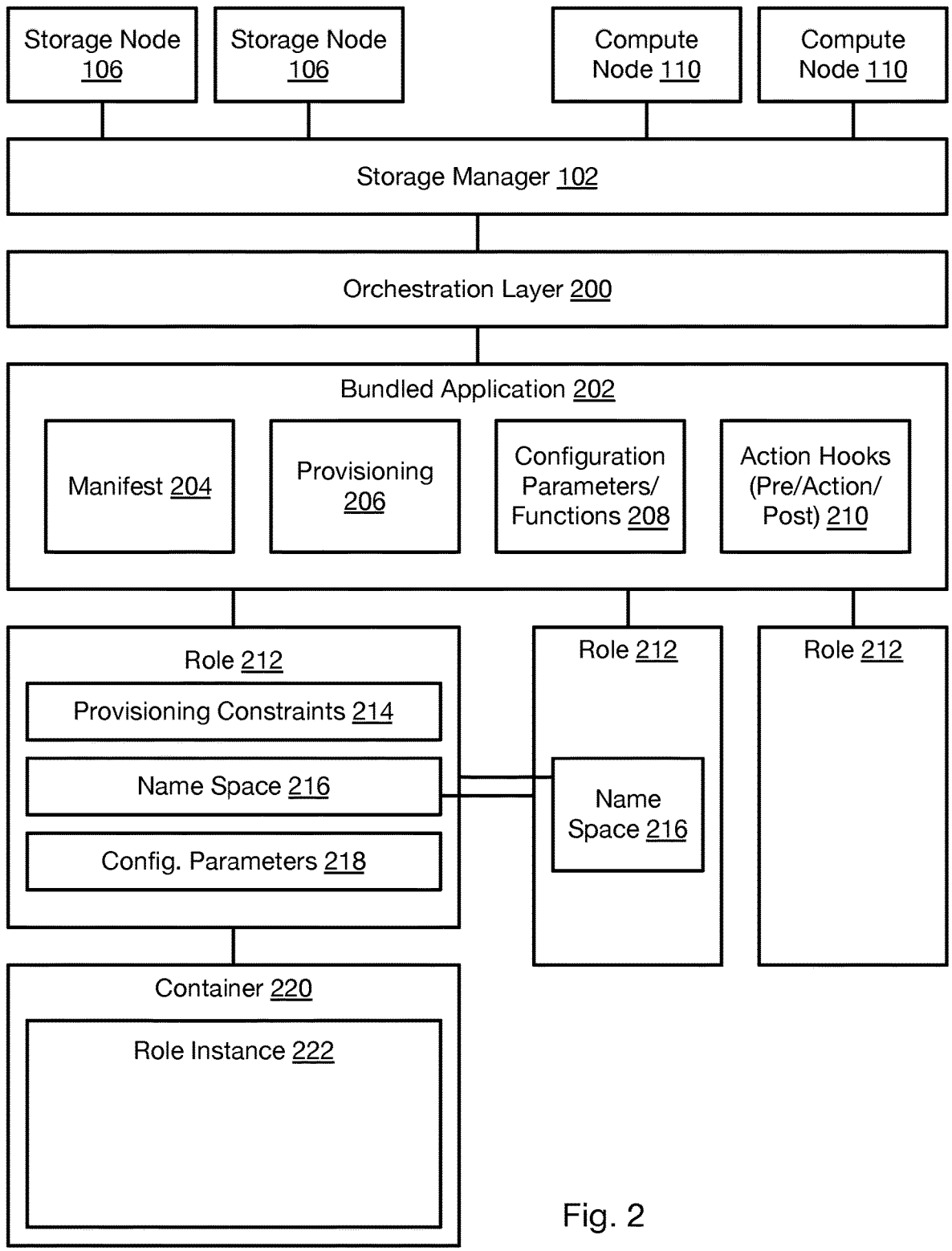
FIG. 2 is a schematic block diagram of components for implementing orchestration of multi-role applications in accordance with an embodiment of the present invention.

Referring to FIG. 2, an application may be deployed on storage and computing resources (on premise and/or on a cloud computing platform) according to an application-orchestration approach. In the illustrates approach, an orchestration layer 200 implements a bundled application 202 including a plurality of roles. In the following description, "bundled application" refers to a bundle of applications as implemented using the orchestration layer. A "role" is an instance of an executable that is managed by the orchestration layer as described herein as part of the bundled application. Accordingly, a "role" may itself be a standalone application, such as a database, webserver, blogging application, or any other application. Examples of roles include the roles used to implement multi-role applications such as CASSANDRA, HADOOP, SPARK, DRUID, SQL database, ORACLE database, MONGODB database, WORDPRESS, and the like. For example, in HADOOP, roles may include one or more of a named node, data node, zookeeper, and AMBARI server.

The orchestration layer 200 may implement a bundled application 202 defining roles and relationships between roles as described in greater detail below. The orchestration layer 200 may execute on a computing device of a distributed computing system (see e.g., FIG. 1), such as on a compute node 110, storage node 106, a computing device executing the functions of the storage manager 102, in a cloud computing platform 112, or some other computing device. Accordingly, actions performed by the orchestration layer 200 may be interpreted as being performed by the computing device executing the orchestration layer 200. In some embodiments, the orchestration layer 200 executes on a computing device that is not part of a distributed computing system or cloud computing platform that executes an application.

The bundled application 202 may include a manifest 204 that defines the roles of the bundled application 202, which may include identifiers of roles and possibly a number of instances for each role identified. The manifest 204 may define dynamic functions define how the number of instances of particular role may grow or shrink depending on usage. The orchestration layer 200 may then create or remove instances for a role as described below as indicated by usage and one or more functions for that role. The manifest 204 may define a topology of the bundled application 202, i.e. the relationship between roles, such as services of a role that are accessed by another role. In instances where an application is implemented using KUBERNETES, the manifest 304 may include HELM charts that describe the configuration of containers of a KUBERNETES-managed application.

The bundled application 202 may include provisioning 206. The provisioning 206 defines the resources of storage nodes 106 and compute nodes 110 required to implement the bundle. The provisioning 206 may define resources for the bundle as a whole or for individual roles. Resources may include a number of processors (e.g., processing cores), an amount of memory (e.g., RAM (random access memory), an amount of storage (e.g., GB (gigabytes) on a HDD (Hard Disk Drive) or SSD (Solid State Drive)). As described below, these resources may be provisioned in a virtualized manner such that the bundled application 202 and individual roles 212 are not informed of the actual location or processing and storage resources and are relieved from any responsibility for managing such resources. In particular, storage resources may be virtualized by the storage manager 102 using the methods described above such that storage volumes are allocated and used without requiring the bundled application 202 or roles to manage the underlying storage nodes 106 and storage device 108 on which the data of the storage volumes is written.

Provisioning 206 may include static specification of resources and may also include dynamic provisioning functions that will invoke allocation of resources in response to usage of the bundled application. For example, as a database fills up, additional storage volumes may be allocated. As usage of a bundled application increases, additional processing cores and memory may be allocated to reduce latency.

A bundled application 202 may further include configuration parameters 208. Configuration parameters may include variables and settings for each role of the bundle. The configuration parameters are defined by the developer of the role and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function. For example, CASSANDRA defines a variable Max_Heap_Size that is normally set to half the memory limit. Accordingly, as the memory provisioned for a CASSANDRA role increases, the value of Max_Heap_Size may be increased to half the increased memory.

The bundled application 202 may further include action hooks 210 for various actions that may be taken with respect to the bundled application and/or particular roles of the bundled applications. Actions may include some or all of stopping, starting, restarting, taking snapshots, cloning, and rolling back to a prior snapshot. For each action, one or more action hooks may be defined. A hook is a programmable routine that is executed by the orchestration layer when the corresponding action is invoked. A hook may specify a script of commands or configuration parameters input to one or more roles in a particular order. Hooks for an action may include a pre-action hook (executed prior to implementing an action), an action hook (executed to actually implement the action), and a post action hook (executed following implementation of the action).

The bundled application 202 may define a plurality of roles 212. Each role may include one or more provisioning constraints. As noted above, the bundled application 202 and roles 212 are not aware of the underlying storage nodes 106 and compute nodes 110 inasmuch as these are virtualized by the storage manager 102 and orchestration layer 200. Accordingly, any constraints on allocation of hardware resources may be included in the provisioning constraints 214. As described in greater detail below, this may include constraints to create separate fault domains in order to implement redundancy and constraints on latency.

The role 212 may define a name space 216. A name space 216 may include variables, functions, services, and the like implemented by a role. In particular, interfaces and services exposed by a role may be included in the name space. The name space may be referenced through the orchestration layer 200 by an addressing scheme, e.g. <Bundle ID>.<Role ID>.<Name>. In some embodiments, references to the namespace 216 of another role may be formatted and processed according to the JINJA template engine or some other syntax. Accordingly, each role 212 may access the variables, functions, services, etc. in the name space 216 of another role 212 on order to implement a complex application topology. In some instances, credentials for authorizing access to a role 212 may be shared by accessing the namespace 216 of that role.

A role 212 may further include various configuration parameters 218 defined by the role, i.e. as defined by the developer that created the executable for the role. As noted above, these parameters 218 may be set by the orchestration layer 200 according to the static or dynamic configuration parameters 208. Configuration parameters may also be referenced in the name space 216 and be accessible (for reading and/or writing) by other roles 212.

Each role 212 may include a container 220 executing an instance 222 of the application for that role. The container 220 may be a virtualization container, such as a virtual machine, that defines a context within which the role instance 222 executes, facilitating starting, stopping, restarting, and other management of the execution of the role instance 222. Containers 220 may include any container technology known in the art such as DOCKER, LXC, LCS, KVM, or the like. In a particular bundled application 202, there may be containers 220 of multiple different types in order to take advantage of a particular container's capabilities to execute a particular role 212. For example, one role 212 of a bundled application 202 may execute a DOCKER container 220 and another role 212 of the same bundled application 202 may execute an LCS container 220.

Note that a bundled application 202 as configured in the foregoing description may be instantiated and used or may be saved as a template that can be used and modified later.

The orchestration layer 200 and an application executing on it may be managed and execute according to the approaches described in the applications listed in Table 1, which are hereby incorporated herein by reference (hereinafter "the incorporated applications").

TABLE 1

Applications Incorporated by Reference

| Title | Filing Date | Serial No. |
|---|---|---|
| Storage Scheme for a Distributed Storage System | Sep. 13, 2017 | 15/703,719 |
| Storage Scheme for a Distributed Storage System | Sep. 13, 2017 | 15/703,790 |
| Storage Scheme for a Distributed Storage System | Sep. 13, 2017 | 15/703,803 |
| Window-Based Priority Tagging Of Iops In A Distributed Storage System | Nov. 8, 2017 | 15/806,769 |
| Allocating Storage Requirements In A Distributed Storage System | Nov. 8, 2017 | 15/807,035 |
| Managing QOS Priorities In Primary And Replica Storage Nodes Of A Distributed Storage System | Nov. 8, 2017 | 15/806,795 |
| Creating Snapshots Of A Storage Volume In A Distributed Storage System | Sep. 5, 2017 | 15/695,818 |
| Creating Snapshots Of A Storage Volume In A Distributed Storage System | Sep. 5, 2017 | 15/695,886 |
| Implementing A Hybrid Storage Node In A Distributed Storage System | Dec. 19, 2017 | 15/847,652 |
| Snapshot Deletion In A Distributed Storage System | Dec. 19, 2017 | 15/847,693 |
| Encoding Tags For Metadata Entries In A Storage System | Dec. 19, 2017 | 15/847,739 |
| Storage Scheme For A Distributed Storage System | Sep. 19, 2017 | 15/709,269 |
| Storage Scheme For A Distributed Storage System | Sep. 19, 2017 | 15/709,296 |
| Multi-Role Application Orchestration In A Distributed Storage System | Jan. 11, 2018 | 15/868,613 |

TABLE 1-continued

Applications Incorporated by Reference

| Title | Filing Date | Serial No. |
|---|---|---|
| Implementing Fault Domain And Latency Requirements In A Virtualized Distributed Storage System | Jan. 11, 2018 | 15/868,652 |
| Implementing Clone Snapshots In A Distributed Storage System | Jan. 11, 2018 | 15/868,682 |
| Implementing Containers For A Stateful Application In A Distributed Computing System | Jan. 11, 2018 | 15/868,725 |
| Accessing Log Files In A Distributed Computing System | Jan. 11, 2018 | 15/868,771 |
| Implementing An Interface To A High-Availability Storage System In A Distributed Computing System | Jan. 11, 2018 | 15/868,818 |
| Upgrading Bundled Applications In A Distributed Computing System | Jan. 12, 2018 | 15/870,321 |
| Implementing Secure Communication In A Distributed Computing System | Jan. 11, 2018 | 15/868,586 |
| Monitoring Containers In A Distributed Computing System | Jan. 12, 2018 | 15/870,296 |
| Automated Management Of Bundled Applications | Nov. 22, 2017 | 16/167,049 |
| Automated Management Of Bundled Applications | Nov. 22, 2017 | 16/167,109 |
| Dynamic Adjustment Of Application Resources In A Distributed Computing System | Jan. 12, 2018 | 15/870,466 |
| Fenced Clone Applications | Jan. 11, 2018 | 15/868,686 |
| Implementing Application Entrypoints With Containers of a Bundled Application | Jan. 11, 2018 | 15/868,740 |
| Job Manager For Deploying A Bundled Application | Jan. 12, 2018 | 15/870,083 |
| Implementing Affinity And Anti-Affinity Constraints In A Bundled Application | Jul. 31, 2018 | 16/050,655 |
| Block Map Cache | Jul. 30, 2018 | 16/049,073 |
| Redo Log For Append Only Storage Scheme | Jul. 30, 2018 | 16/049,279 |
| Implementing Storage Volumes Over Multiple Tiers | Jul. 31, 2018 | 16/050,801 |
| Relocation Of A Primary Copy Of A Replicated Volume | Jul. 30, 2018 | 16/049,416 |
| Storage Scheme for a Distributed Storage System | Sep. 13, 2017 | 15/703,719 |
| Storage Scheme for a Distributed Storage System | Sep. 13, 2017 | 15/703,790 |
| Storage Scheme for a Distributed Storage System | Sep. 13, 2017 | 15/703,803 |
| Window-Based Priority Tagging Of Iops In A Distributed Storage System | Nov. 8, 2017 | 15/806,769 |
| Allocating Storage Requirements In A Distributed Storage System | Nov. 8, 2017 | 15/807,035 |
| Managing QOS Priorities In Primary And Replica Storage Nodes Of A Distributed Storage System | Nov. 8, 2017 | 15/806,795 |
| Creating Snapshots Of A Storage Volume In A Distributed Storage System | Sep. 5, 2017 | 15/695,818 |
| Creating Snapshots Of A Storage Volume In A Distributed Storage System | Sep. 5, 2017 | 15/695,886 |
| Implementing A Hybrid Storage Node In A Distributed Storage System | Dec. 19, 2017 | 15/847,652 |
| Snapshot Deletion In A Distributed Storage System | Dec. 19, 2017 | 15/847,693 |
| Encoding Tags For Metadata Entries In A Storage System | Dec. 19, 2017 | 15/847,739 |
| Storage Scheme For A Distributed Storage System | Sep. 19, 2017 | 15/709,269 |
| Storage Scheme For A Distributed Storage System | Sep. 19, 2017 | 15/709,296 |
| Multi-Role Application Orchestration In A Distributed Storage System | Jan. 11, 2018 | 15/868,613 |
| Implementing Fault Domain And Latency Requirements In A Virtualized Distributed Storage System | Jan. 11, 2018 | 15/868,652 |
| Implementing Clone Snapshots In A Distributed Storage System | Jan. 11, 2018 | 15/868,682 |

TABLE 1-continued

Applications Incorporated by Reference

| Title | Filing Date | Serial No. |
|---|---|---|
| Implementing Containers For A Stateful Application In A Distributed Computing System | Jan. 11, 2018 | 15/868,725 |
| Accessing Log Files In A Distributed Computing System | Jan. 11, 2018 | 15/868,771 |
| Implementing An Interface To A High-Availability Storage System In A Distributed Computing System | Jan. 11, 2018 | 15/868,818 |
| Upgrading Bundled Applications In A Distributed Computing System | Jan. 12, 2018 | 15/870,321 |
| Implementing Secure Communication In A Distributed Computing System | Jan. 11, 2018 | 15/868,586 |
| Monitoring Containers In A Distributed Computing System | Jan. 12, 2018 | 15/870,296 |
| Automated Management Of Bundled Applications | Nov. 22, 2017 | 16/167,049 |
| Automated Management Of Bundled Applications | Nov. 22, 2017 | 16/167,109 |
| Dynamic Adjustment Of Application Resources In A Distributed Computing System | Jan. 12, 2018 | 15/870,466 |
| Fenced Clone Applications | Jan. 11, 2018 | 15/868,686 |
| Implementing Application Entrypoints With Containers of a Bundled Application | Jan. 11, 2018 | 15/868,740 |
| Job Manager For Deploying A Bundled Application | Jan. 12, 2018 | 15/870,083 |
| Implementing Affinity And Anti-Affinity Constraints In A Bundled Application | Jul. 31, 2018 | 16/050,655 |
| Block Map Cache | Jul. 30, 2018 | 16/049,073 |
| Redo Log For Append Only Storage Scheme | Jul. 30, 2018 | 16/049,279 |
| Implementing Storage Volumes Over Multiple Tiers | Jul. 31, 2018 | 16/050,801 |
| Relocation Of A Primary Copy Of A Replicated Volume | Jul. 30, 2018 | 16/049,416 |

Referring to FIG. 3, logical storage volumes (also referred to herein as simply "storage volumes") may be assigned to a "storage unit," the storage unit may be embodied as a storage node 106, individual storage devices 108, or to units of storage defined by a cloud computing platform. Portions of logical storage volumes may also be assigned, referred to herein as slices. A slice may be defined by its starting address within the logical storage volume.

A mapping table 300 may be maintained for a logical storage volume or a portion of a logical storage volume assigned to a storage unit. The mapping table 300 may be stored on the storage unit to which the logical storage volume or the portion of the logical storage volume assigned. Alternatively, the mapping table 300 may be stored in memory or a persistent storage device of a compute node 110. The mapping table 300 may be maintained in other storage associated with a computing resource, e.g., virtual machine or container, executing on a cloud computing platform 112.

In general, as described hereinbelow, the mapping table 300 is stored on the same computing platform (on premise or particular cloud computing platform 112) as executes the application. In particular, the role instances 222 of a bundled application 202 may execute exclusively on a same computing platform in some instances. Accordingly, the mapping table 300 may be stored locally to that same computing platform.

The entries of the mapping table 300 may each correspond to a segment of the logical storage volume or portion of a storage volume represented by the mapping table 300. A virtual storage volume or segment of a storage volume may include a plurality of segments. For example, a logical storage volume may be 1 TB in size, a slice may be 1, 10, or 100 GB in size, and a segment may be from 1 to 32 MB in size. This example of sizes is exemplary only.

Each segment may be identified by an identifier. In the illustrated embodiment, the identifier is a virtual segment identifier (VSID) 302. For example, each time a segment of a virtual storage volume is allocated, it may be assigned a VSID 302. In some embodiments, each time a physical segment (i.e., actual portion of a physical storage device) of a storage unit is allocated to the virtual storage volume or portion of the virtual storage volume, that physical segment is assigned a VSID 302 and mapped to that VSID 302. In some embodiments, the VSIDs are assigned according to a monotonically increasing order such that each VSID has a higher value than all VSIDs assigned previously. The manner in which segments are allocated and VSIDs are assigned may be according to any of the approaches described in the incorporated applications.

In some embodiments, each VSID is mapped to an identifier of write unit (WU 304) within the storage unit. The WU 304 is an identifier or address within the storage unit that is used to identify the physical location where a segment is stored. For a disk, the WU 304 may refer to a physical segment identifier. For a could computing platform 112, the WU 304 may be a virtual segment identifier that is used by the cloud computing platform to identify the location of data. In some embodiments, a separate table may map the VSIDs 302 of a particular storage volume or portion of a storage volume to the WUs 304 mapped to those VSIDs 302.

In some embodiments, each storage volume or each portion (e.g., slice) of a storage volume has its own mapping table 300. Accordingly, the mapping table may be labeled with or otherwise associated with a volume identifier 306 and/or slice identifier 308 to which the mapping table 300 corresponds. In the illustrated embodiment, the mapping table 300 includes entries for multiple storage volumes and slices such that each entry is labeled with the volume identifier 306 and slice identifier 308 to which a particular VSID 302 corresponds.

A segment may be assigned to a particular snapshot of a logical storage volume or portion of a logical storage volume. In particular, in response to an instruction to create a new snapshot for a logical storage volume or portion of a logical storage volume, all VSIDs 302 allocated to that logical storage volume or the portion of the logical storage volume may be labeled with a snapshot identifier 310 of a current snapshot, which may be an identifier included in the instruction or inferred based on a number of previously created snapshots. The manner in which snapshots are implemented and written to may be performed according to the approaches described in the incorporated applications.

Figure 4:
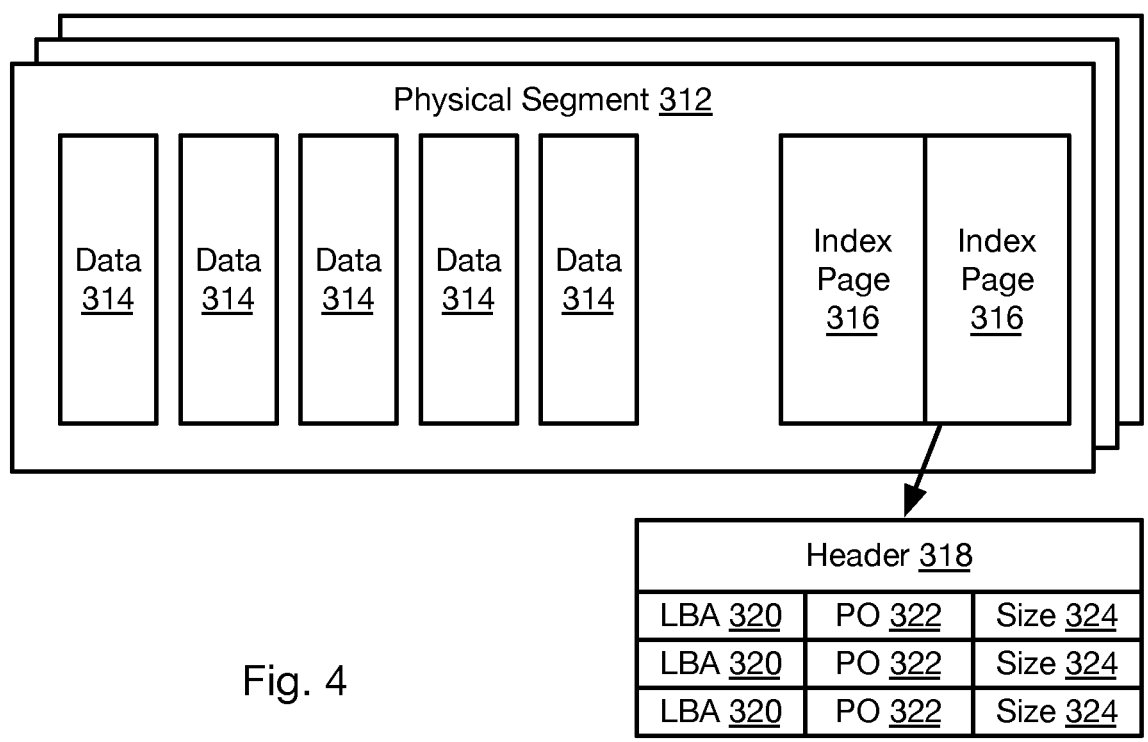
FIG. 4 is a schematic diagram illustrating a format for a data segment in accordance with an embodiment of the present invention.

Referring to FIG. 4, a VSID 302 may be mapped to a physical segment 312 of the storage unit, e.g., the write unit field 304 may be mapped to a physical segment 312. In some embodiments, payload data 314 from write operations is written to the physical segment starting from a first end (left end in FIG. 4)) whereas metadata corresponding to the write operations is written starting from a second end opposite the first end (right end in FIG. 4) in index pages 316. For example, each index page 316 may include a header 318 with entries including a logical block address (LBA) 320 and physical offset (PO) 322 within the physical segment 312 at which payload data 314 corresponding to that LBA 320 was written. In some embodiments, the entry may further indicate a size 324 of the payload data 314 written at the PO 322. As index pages 316 are filled with entries, additional index pages 316 are added starting moving inward from the second end. The manner in which data is written to segments 312 and retrieved from segments, including performing garbage collection, may be performed as described in the incorporated applications.

In some embodiments, the entry for a VSID 302 may further indicate a data offset (DO) 326 indicating the first free location from the first end of the physical segment 312 corresponding to that VSID 302 and a metadata offset 328 indicating the first free location starting from the second end that is available for a metadata entry.

In some embodiments, the entry for a VSID 302 in the mapping table 300 may include a tier identifier 330 that indicates a computing platform on which the physical segment 312 corresponding to that VSID 302 is located. In particular, a premise computing platform (storage nodes 106, compute nodes 110) may have a unique tier ID 330, a particular cloud computing platform 112 may have a unique tier ID 330. As will be described below, the tier ID of the computing platform where a segment is stored may be different from the tier ID of the computing platform where the mapping table 300 is stored and roles of an application are executing.

In some embodiments, each entry of the mapping table 300 further includes a universal unique identifier (UUID) 332. The UUID may be unique across all storage volumes of a bundled application such that a segment 312 with its corresponding VSID 302 may be uniquely identified by all roles of the bundled application. For example, duplication of data may be reduced by mapping an LBA to the UUID of a segment storing the same data. UUIDs 332 may be implemented by the storage manager 102, which may be queried for a UUID 332 when a segment is allocated to a storage volume of a bundled application and responds with a UUID 332 that is unique for all segments of the bundled application. Likewise, a container 220 of a bundled application may store UUIDs 332 for segments that it is using. Another container may access the same segments by using the same UUIDs 332. In some embodiments, a separate UUID table may map UUIDs to a location where the UUID is located (e.g., tier ID and/or storage node 106 ID). In this manner, roles 212 may readily determine where a segment identified by a UUID is located.

In some embodiments, the mapping table 300 may be used in combination with a block map 334. For example, a block map 334 may be maintained for each logical storage volume or for each slice of a logical storage volume. For example, each time a write request is executed that writes data to a particular LBA 336 of a slice, an entry in the block map 334 for that slice corresponding to that LBA 336 may be updated to include the VSID 338 (and/or UUID 332) mapped to the segment 312 to which the payload data 314 of the write request was written. In some embodiments, the entry of the block map 334 may further include a data offset 340 at which the payload data 314 at which the payload data was written within the segment 312. If that LBA 336 is subsequently overwritten by another write request, the VSID 338 and DO 340 for that LBA will be updated to indicate the location of the payload data from the other write request. In some instances, the entries of a block map 334 each correspond to an LBA 336 such that the entry for an LBA 336 does not contain that LBA 336. The block map 334 may be stored in the same location as the mapping table 300, e.g., within the storage resources (storage nodes 106 or cloud storage 116) of the computing platform executing a bundled application.

Figure 5A:
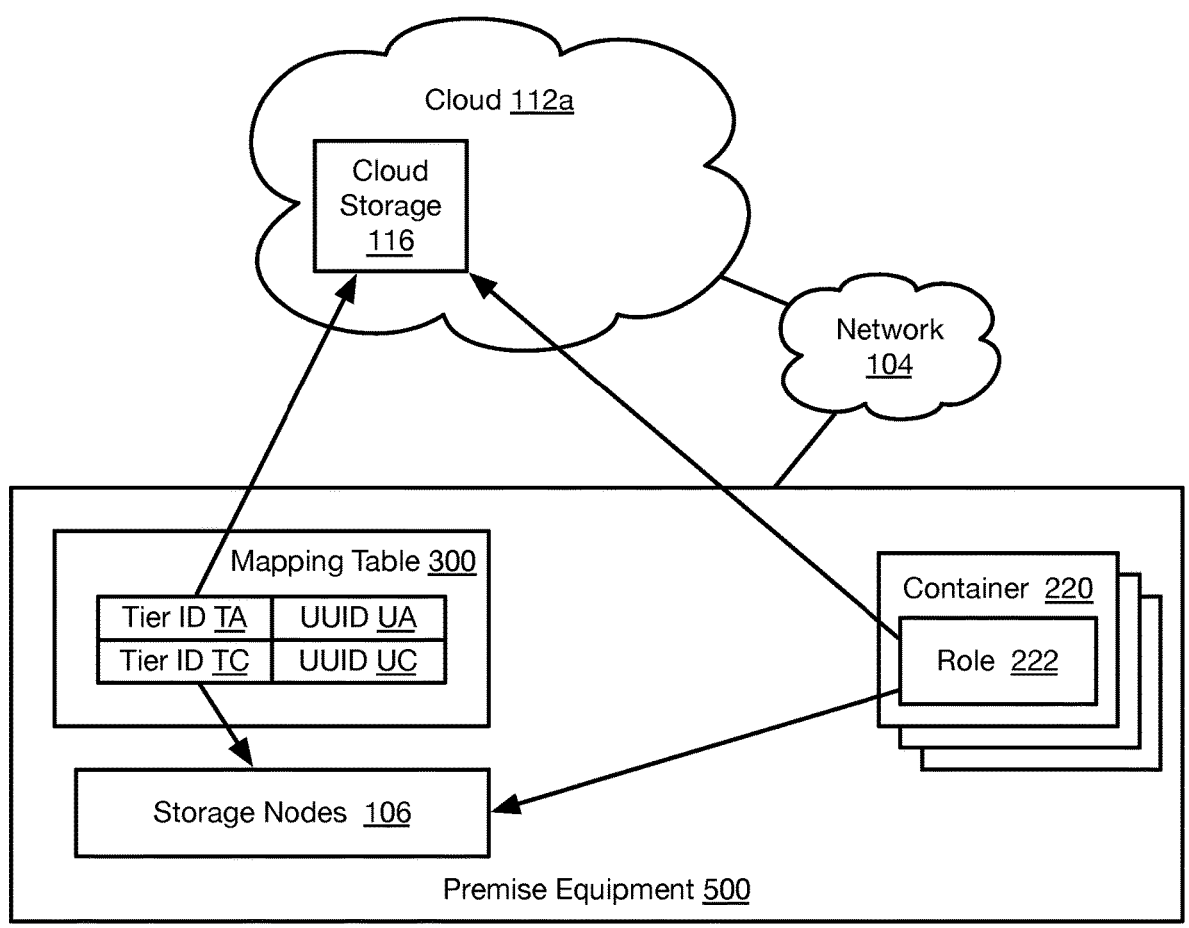
FIGS. 5A to 5O are process flow diagrams illustrating a process of migrating an application and its data between computing platforms in accordance with an embodiment of the present invention.

FIGS. 5A to 5D illustrate how a bundled application may be migrated between computing platforms using a mapping table 300. Referring to FIG. 5A, in an initial configuration the mapping table 300, containers 220, and role instances 222 are located on premise equipment 500 (storage nodes 106 and compute nodes 110). The segments of one or more logical storage volumes are stored by storage nodes 106 of the premise equipment 500 and segments of the one or more logical storage volumes are also stored on a different computing platform, such as in cloud storage 116 of a cloud computing platform 112a or storage nodes 106 of a different facility. As shown, the mapping table 300 includes entries for segments on the premise equipment (tier ID TC, UUID UC) and in cloud computing platform 112a (tier ID TA, UUID UA).

Accordingly, the entries in the mapping table 300 for first segments stored by the storage nodes 106 would reference the tier ID 330 of the premise equipment 500. Entries in the mapping table 300 for second segments stored by the cloud storage 116 of the cloud computing platform 112a will include the tier ID 330 of that cloud computing platform.

Accordingly, reads directed addressed to LBAs having data stored in the first segments from the role instances 222 will be handled locally by the storage nodes 106 whereas reads directed to LBAs having data stored in the second segments will be routed to the cloud computing platform 112a.

Figure 5B:
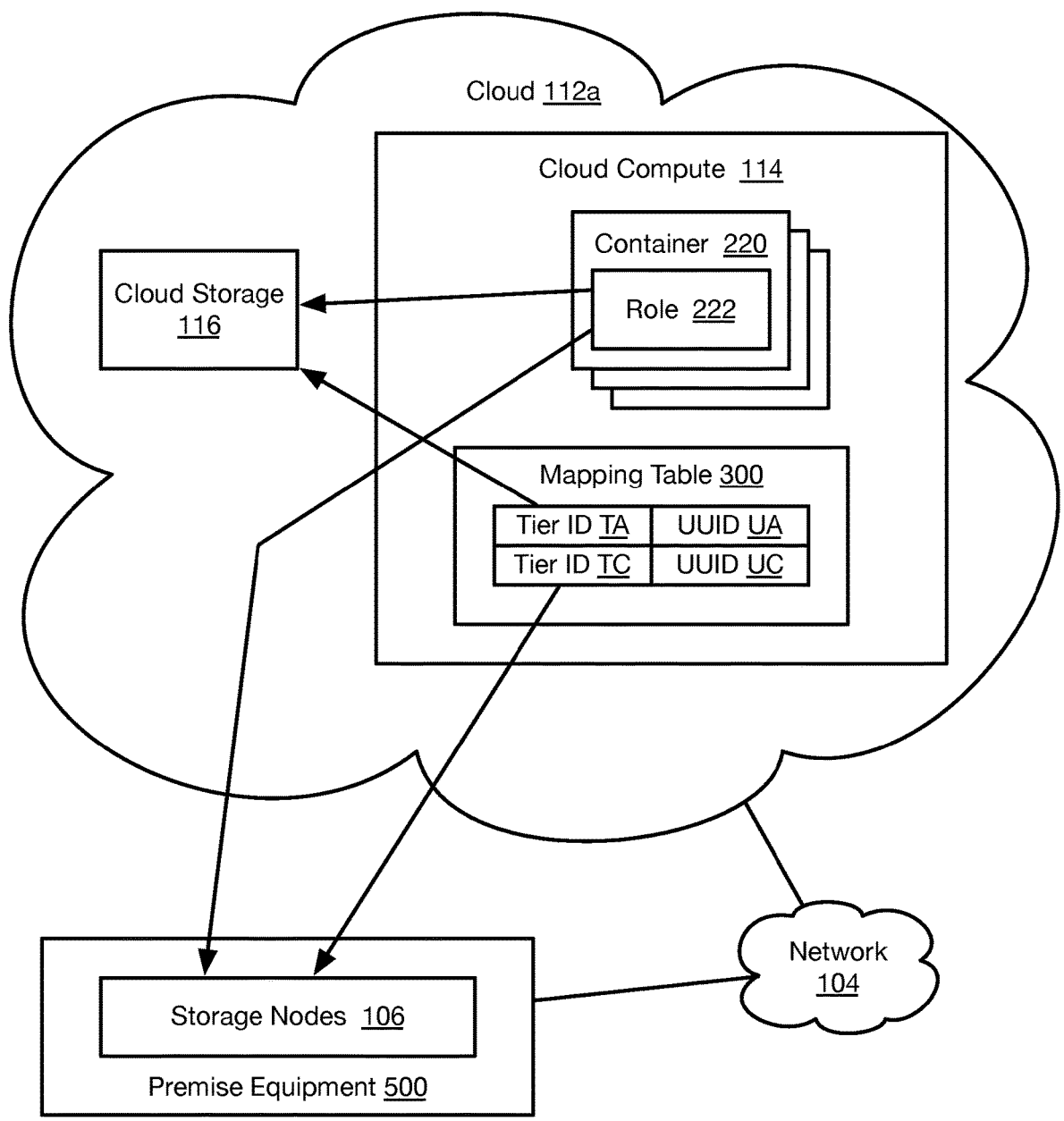

Referring to FIG. 5B, a user may transfer the role instances 222 of the bundled application 202 to the cloud computing platform 112a. The mapping table 300 may likewise be copied to the cloud computing platform 112a without requiring modification. In particular, the tier IDs 330 of entries in the mapping table 300 need not be changed as a result of the transfer. Instead, the role instances 222 may continue to access the first segments on the storage nodes 106 of the premise equipment.

Figure 5C:
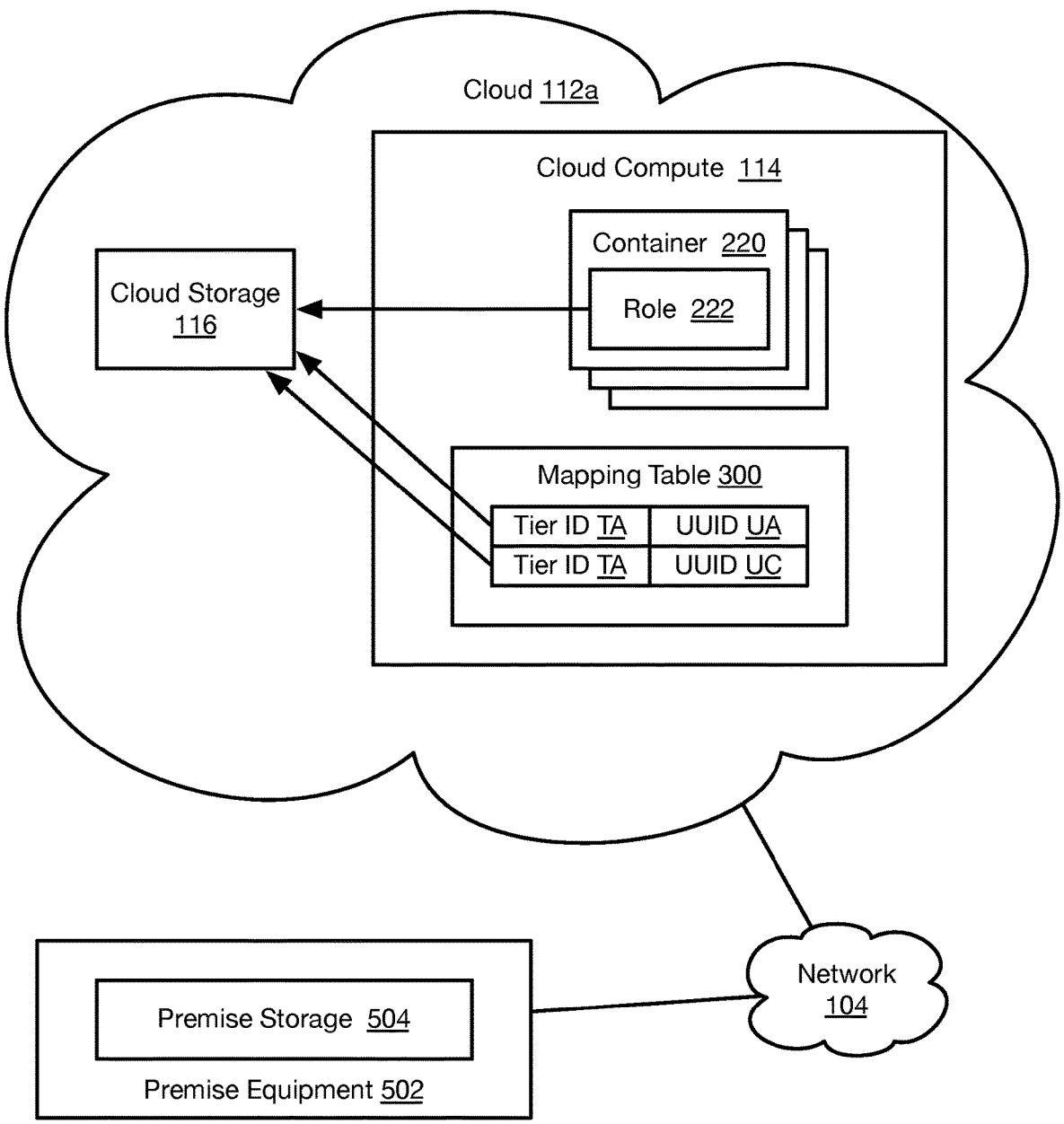

As the first segments are used they may be migrated to the cloud storage 116, e.g. segments with higher read frequency will be transferred to cloud storage 116 before segments with lower read frequency. Accordingly, over time the state of the application will become as shown in FIG. 5C, wherein all segments are in cloud storage 116. The tier ID 330 of all segments will therefore reference the cloud computing platform 112a. As shown, the mapping table 300 now maps the segments for UUID UA and UUID UC to tier ID TA corresponding to cloud computing platform 112a.

Inasmuch as the data of an application does not need to be transferred to a new computing platform when it is transferred, the amount of down time is reduced and service may resume more quickly.

Figure 5D:
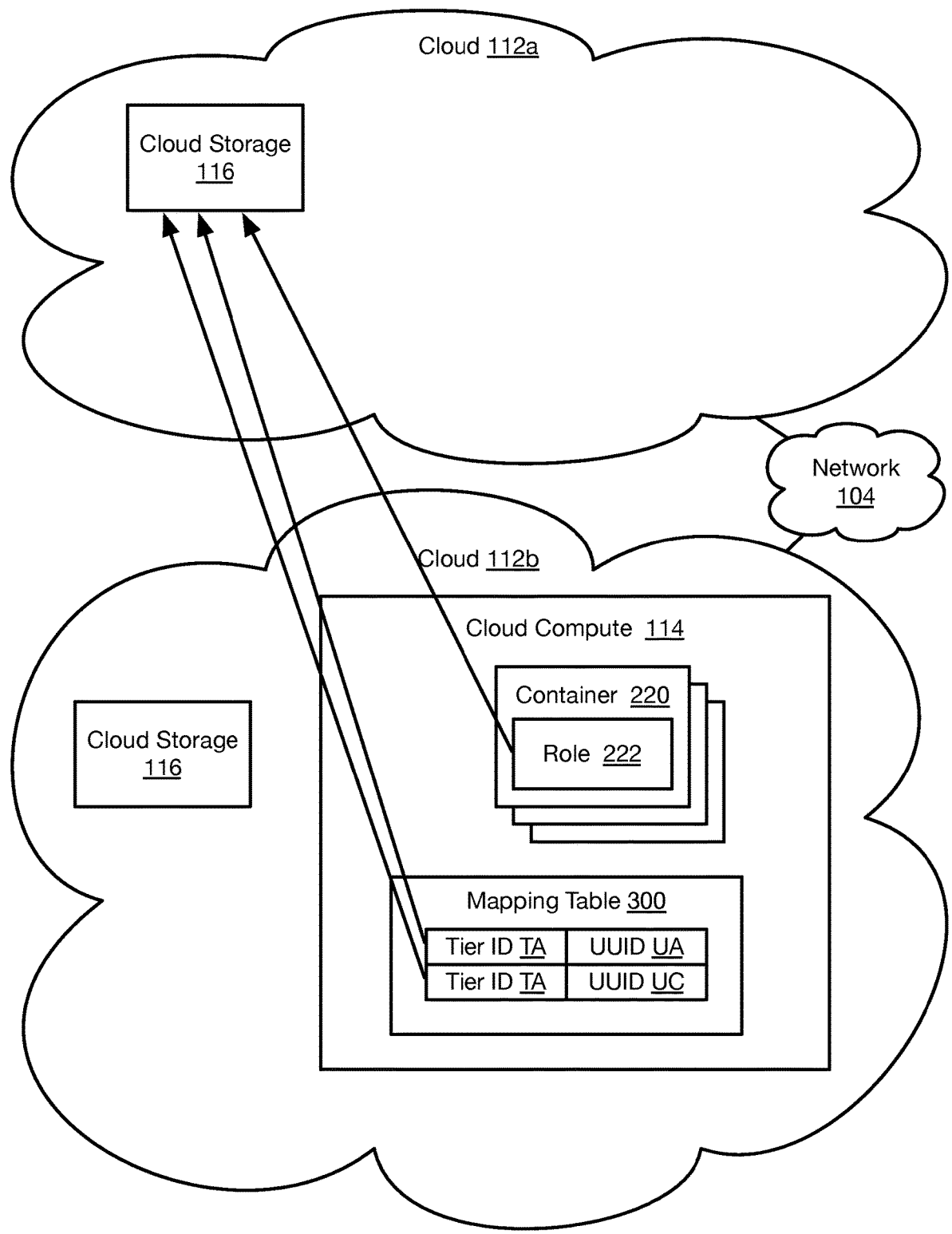
Figure 5E:
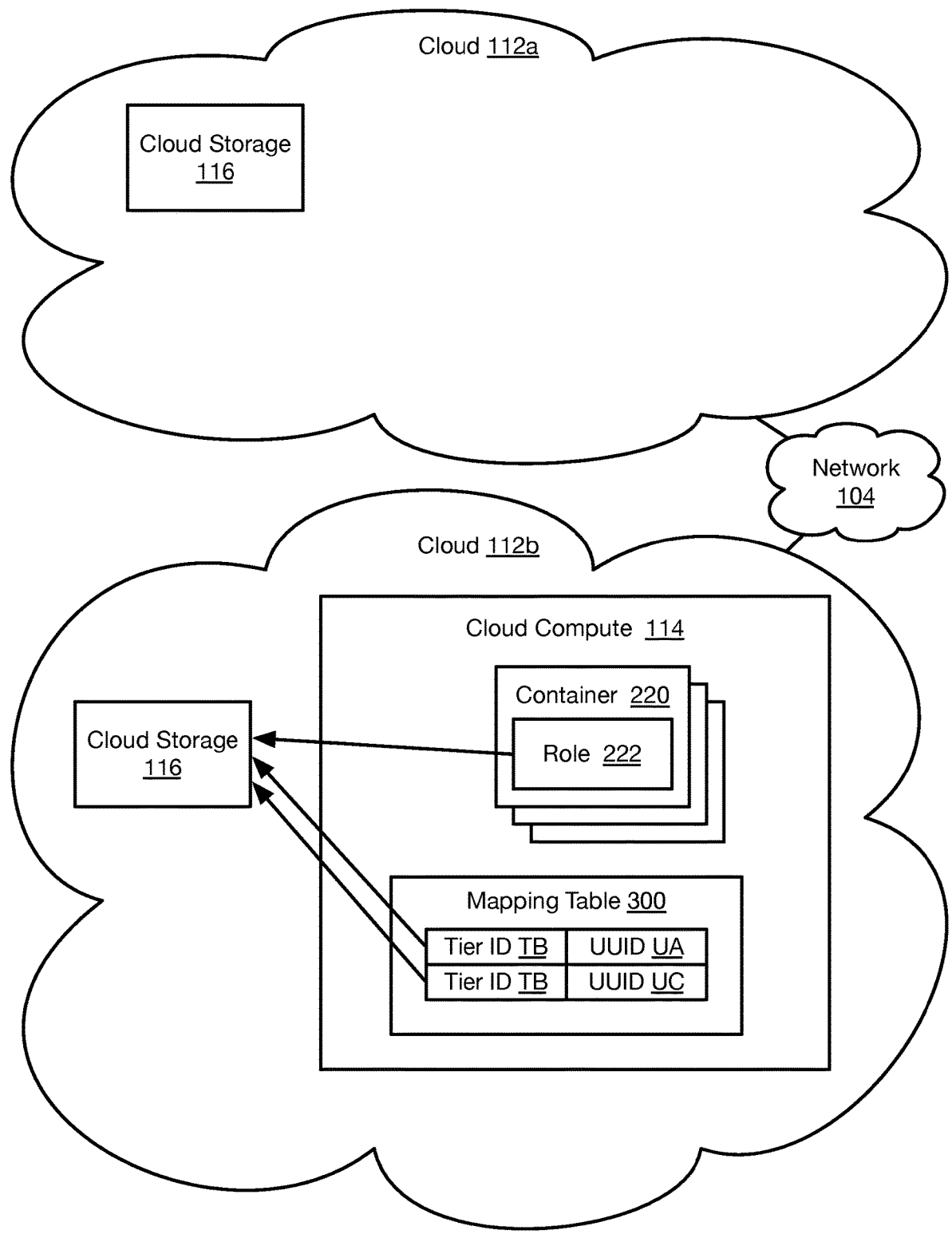

FIGS. 5D and 5E illustrate the migration of an application from one cloud computing platform 112a to a different cloud computing platform 112b. As shown in FIG. 5D, the role instances 212 and containers 220 of a bundled application are migrated to the second cloud computing platform 112b along with the mapping table 300. As for the case of FIGS. 5A to 5C, some or all of the data segments of the storage volumes of the bundled applications may remain in the cloud storage 116 of the first cloud computing platform 112a. Using the references to the cloud computing platform 112a in the mapping table 300, the roles 212 may continue to access the segments in the storage 116 of the cloud computing platform 112a until they are migrated to the storage 116 of the cloud computing platform 112b, as shown in FIG. 5E. As before, once migrated, the tier ID 330 of the segments may be updated to reference the cloud computing platform 112b. As shown, the mapping table 300 now maps the segments for UUID UA and UUID UC to tier ID TB corresponding to cloud computing platform 112b.

Referring to FIG. 5F, in some instances, a bundled application 202 may execute on multiple cloud computing platforms 112a, 112b. For example, certain role instances 222a may execute within containers 220 in the computing resources 114 of the cloud computing platform 112a. Other role instances 222b may execute within containers 220 in the computing resources 114 of the cloud computing platform 112b.

Likewise, segments 312a storing data for logical storage volumes mounted to containers 220 on the cloud computing platform 112a may be stored in the storage resources 116 of the cloud computing platform 112a. Segments 312b storing data for logical storage volumes mounted to containers 220 on the cloud computing platform 112b may be stored in the storage resources 116 of the cloud computing platform 112b.

As for other embodiments, a mapping table 300a may be stored on the cloud computing platform 112a and include entries corresponding to the segments 312a, i.e. the write unit 304 identifying the segments 312a and mapping the segments 312a to the tier identifier 330 of the cloud computing platform 112a. A mapping table 300b may be stored on the cloud computing platform 112b and include entries corresponding to the segments 312b, i.e. identifying the write unit 304 identifying the segments 312b and mapping the segments 312b to the tier identifier 330 of the cloud computing platform 112b.

As shown in FIG. 5G, an administrator may migrate the role instances 222a, 222b to one or more premise equipment installations 500. Accordingly, snapshots of the role instances 222a, 222b will be restored on the premise equipment 500 according to the embodiments disclosed herein. The mapping tables 300a, 300b may likewise be copied to the premise equipment and used by the restored role instances 222a, 222b. As for other embodiments, the segments 312a, 312b may continue to reside on the cloud computing platforms 112a, 112b and the mapping tables 300a, 300b will continue to reference the tier IDs of the cloud computing platforms 112a, 112b, respectively, as the storage location for the VSIDs 302 and/or UUIDs 332 of the segments 312a, 312b.

Figure 5H:
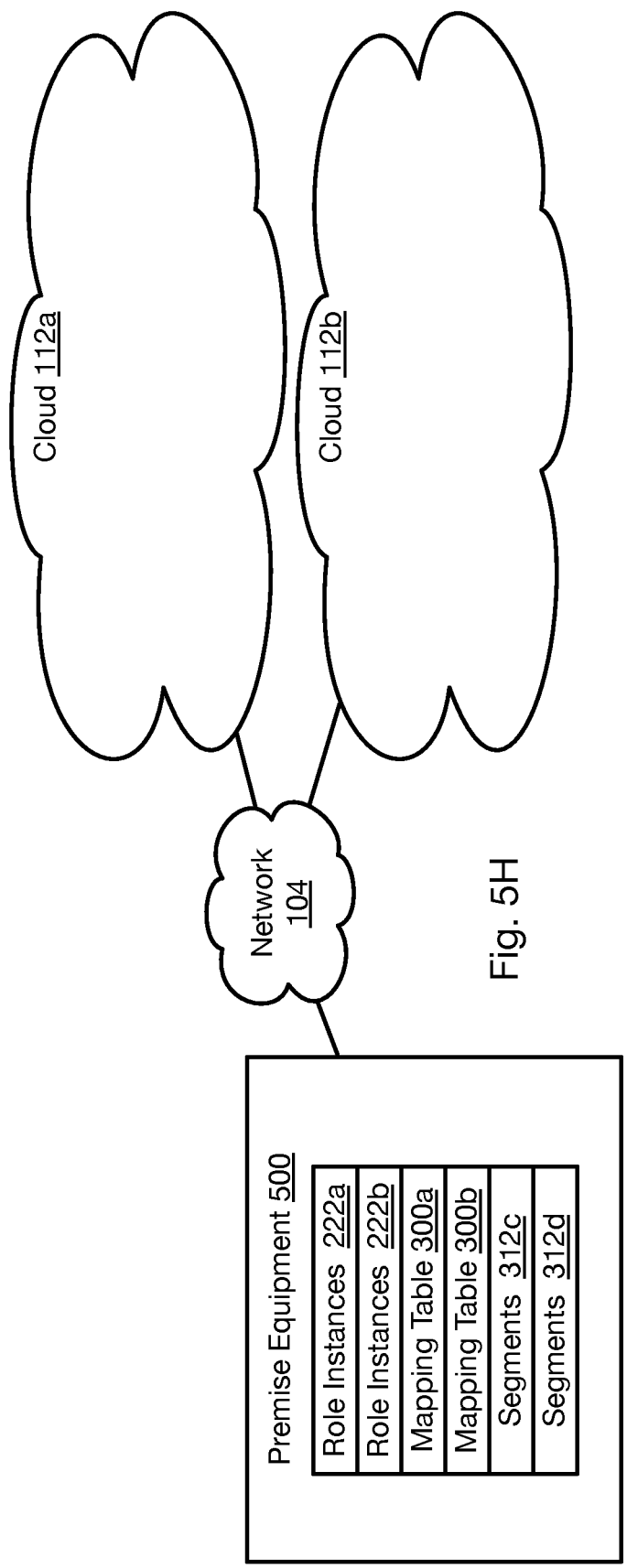

As shown in FIG. 5H, the segments 312a, 312b may eventually be copied to segments 312c, 312d of storage on the premise equipment and the mapping tables 300a, 300b may then be updated such that the entries corresponding to the segments 312a, 312b now refer to the write units of the segments 312c, 312d, respectively, and the tier ID of the premise equipment 500.

Figure 5I:
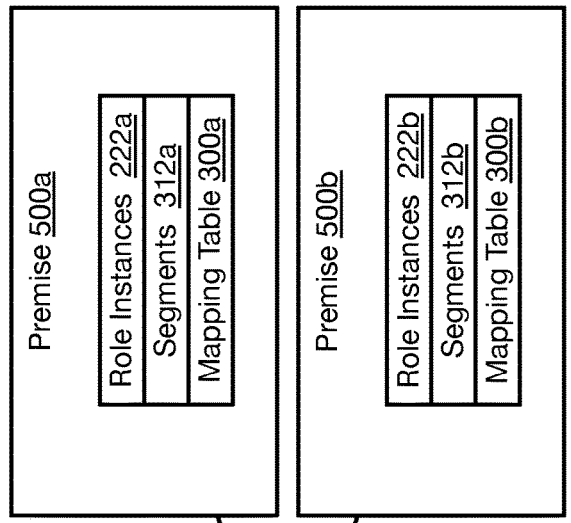

Referring to FIG. 5I, in some instances, a bundled application 202 may execute on multiple installations of premise equipment 500a, 500b. For example, certain role instances 222a may execute within containers 220 in the compute nodes 110 of premise equipment 500a. Other role instances 222b may execute within containers 220 in the compute nodes 110 of premise equipment 500b.

Likewise, segments 312a storing data for logical storage volumes mounted to containers 220 on premise equipment 500a may be stored in the storage nodes 106 of the premise equipment 500a. Segments 312b storing data for logical storage volumes mounted to containers 220 on the premise equipment 500b may be stored in the storage nodes 106 of the premise equipment 500b.

As for other embodiments, a mapping table 300a may be stored on the premise equipment 500a and include entries corresponding to the segments 312a, i.e. identifying the write unit 304 of the storage nodes 106 corresponding to the segments 312a and mapping the segments 312a to the tier identifier 330 of the premise equipment 500a. A mapping table 300b may be stored on the premise equipment 500b and include entries corresponding to the segments 312b, i.e. the write unit 304 identifying the segments 312b on the storage nodes 106 and mapping the segments 312b to the tier identifier 330 of the premise equipment 500b.

Figure 5J:
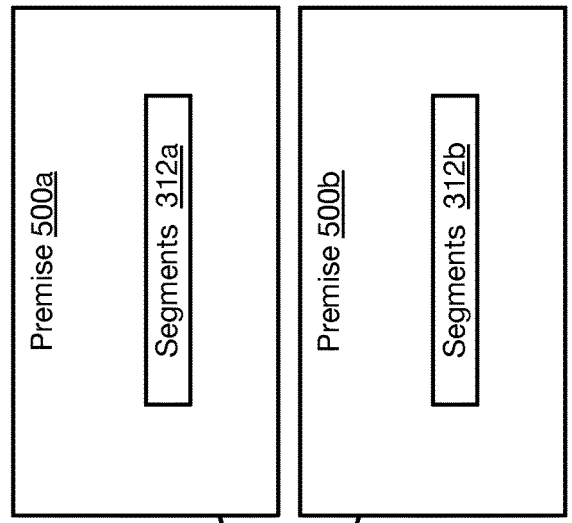

As shown in FIG. 5J, an administrator may migrate the role instances 222a, 222b to one or more cloud computing platforms 112. Accordingly, snapshots of the role instances 222a, 222b will be restored on the cloud computing platforms 112 according to the embodiments disclosed herein. The mapping tables 300a, 300b may likewise be copied to the cloud computing platforms 112 and used by the restored role instances 222a, 222b. As for other embodiments, the segments 312a, 312b may continue to reside on the premise equipment 500a, 500b and the mapping tables 300a, 300b will continue to reference the tier IDs of the premise equipment 500a, 500b, respectively, as the storage location for the VSIDs 302 and/or UUIDs 332 of the segments 312a, 312b.

Figure 5K:
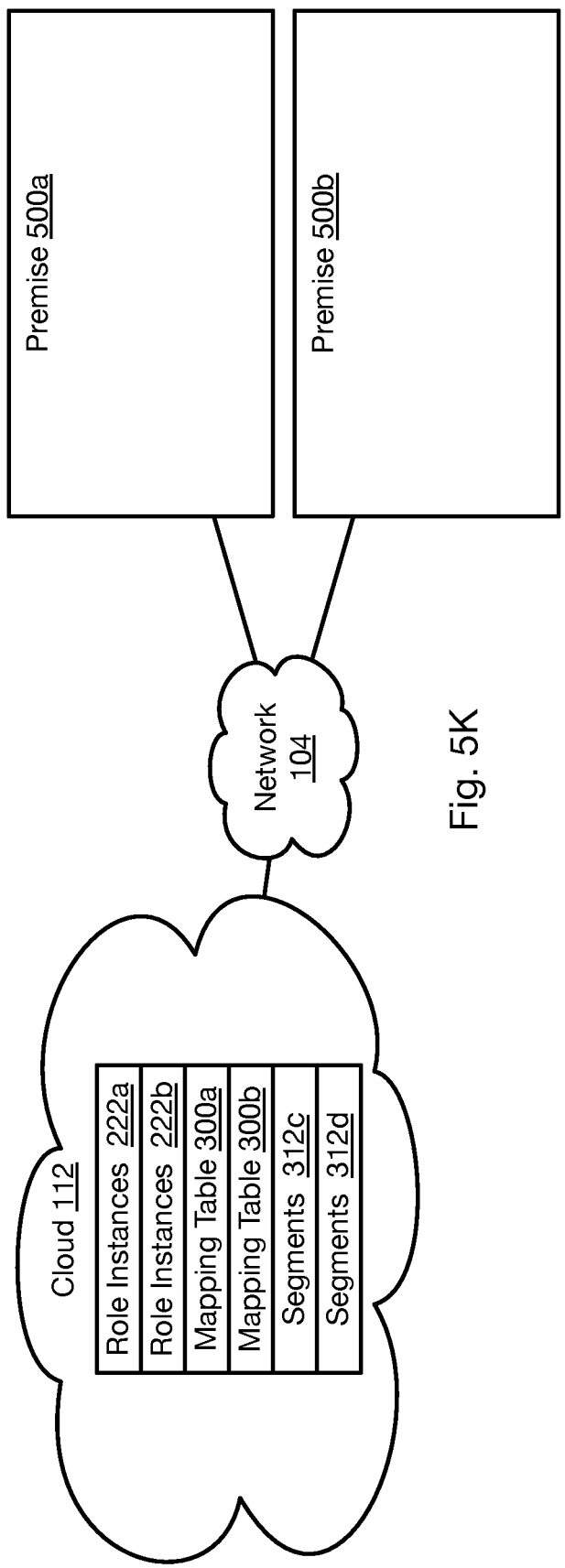

As shown in FIG. 5K, the segments 312a, 312b may eventually be copied to segments 312c, 312d in cloud storage resources 116 storage on the cloud computing platform 112 and the mapping tables 300a, 300b may then be updated such that the entries corresponding to the segments 312a, 312b now refer to the write units of the segments 312c, 312d, respectively, and the tier ID of the computing platform 112.

Referring to FIGS. 5L to 5O, in some embodiments, some or all of the segments for a logical storage volume mounted to a bundled application 202 may be stored on a remote file system, such as NFS or SMB. Accordingly, each remote file system may have a corresponding tier ID that is stored in the mapping table 300 to indicate which segments are stored on each remote file system.

Referring to FIG. 5L, in one scenario, role instances 222 of the bundled application execute within containers 220 executing on the compute nodes 110 of premise equipment 500. The mapping table 300 maps segments 312 of storage on the storage nodes 106 to the tier ID of the premise equipment and the VSIDs 302 and/or UUIDs 332 mapped to these segments 312. The VISIDs 302 and UUIDs 3322 correspond to logical storage volumes mounted to the containers 220.

As shown in FIG. 5M, the role instances 222 may be restored as role instances 222 executing on a cloud computing platform 112a. The mapping table 300 may likewise be copied to the cloud computing platform 112a and continue to refer to the segments 312 that continue to reside on the premise equipment 500.

For example, as shown in FIG. 5N, some segments 312a of the segments 312 may be migrated to the storage resources 116 of the cloud computing platform 112a. Other segments 312b from the segments 312 may be migrated to a remote file system 112b. In either case, the VSIDs 302 or UUIDs 332 of the segments 312a, 312b are mapped to the tier IDs of the cloud 112a or remote file system 112b where they are stored. Likewise, the write unit field 304 will be updated to refer to the location of the segments 312a, 312b on the cloud computing platform 112a and remote file system 112b.

Referring to FIG. 5O, various migration scenarios may then occur. For example, segments 312c of a logical storage volume of the bundled application 202 may reside on the storage nodes 106 of premise equipment. Segments 312a, 312b may reside on a cloud computing platform 112 or a remote file system 112b to the premise equipment 500. The mapping table 300 may reside on premise equipment 500 along with role instances 222 of the bundled application. The mapping table 300 will then refer to the write units 304 and tier IDs of the segments 312a, 312b, 312c mapped to their corresponding VSIDs 302 and/or UUIDs 332.

Figure 6:
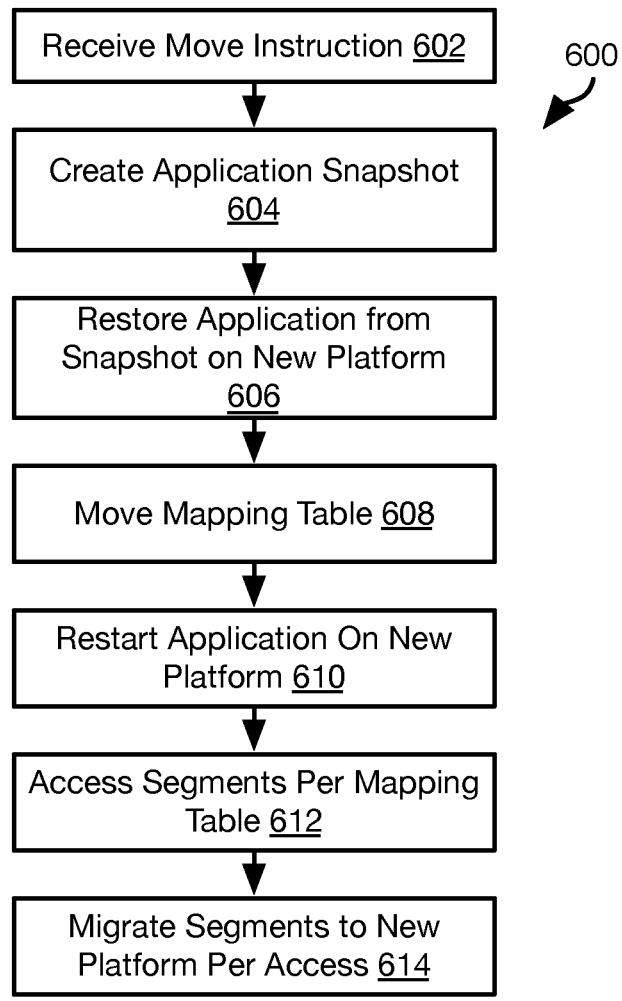
FIG. 6 is a process flow diagram of a method for migrating an application to a different computing platform in accordance with an embodiment of the present invention.

Referring to FIG. 6, the illustrated method 600 may be executed by the orchestration layer 200 in order to transfer a bundled application from one computing platform to another. The method 600 may include receiving 602 a move instruction, such as from a user or administrator of the bundled 202. The remainder of the method 600 may be performed in response to receiving the move instructions.

The method 600 may include creating 604 a snapshot of the application. In particular, step 600 may include capturing some or all of a state of operation of role instances 212 of the application 202; capturing a topology of the application 200 including number of instances 222 of each role 212 and relationships between role instances 222; and creating snapshots of storage volumes of the application 200. An example of how this may be performed is described below with respect to FIG. 9 and is also described in the incorporated applications.

The method 600 may further include restoring 606 the bundled application 200 from the snapshot on the new platform. This may include creating instances of containers 220 and instances of roles 222 executing within containers 220 according to the topology of the snapshot from step 604. This may include configuring the role instances 222 to interact with one another according to the topology captured by the snapshot from step 604. The role instances 222 may be restored to a state of a corresponding role instance 222 in the snapshot of the bundled application.

The method 600 may further include moving 608 the mapping table 300 or mapping tables 300 for the logical storage volumes of the application to the new computing platform.

The method 610 may then include restarting 610 the restored application from step 606 on the new computing platform. Restarting 610 may be performed in some embodiments prior to transferring any segments from the original computing platform to the new computing platform. In particular, though some segments may reside on the new computing platform, the process of transferring from step 604 to 610 may be performed without any additional copying of segments to the new computing platform. In other embodiments, less than 10 percent, preferably less than 5 percent, of the segments of the segments of the logical storage volumes of the application are copied to the new computing platform subsequent to receiving the move instruction 602 and before the application is restarted on the new computing platform.

The manner in which the snapshot of the application is restored 606 and restarted on the new computing platform may be according to the approach described below with respect to FIG. 10.

The method 600 may then include executing the application on the new computing platform such that the role instances 222 of the restored application access 612 the segments of the logical storage volumes using the one or more mapping tables 300. As segments are accessed, they may also be migrated 614 to the new computing platform, which will include updating the one or more mapping tables to change the tier ID 330 of the migrated segments to refer to the new computing platform. Likewise, when a segment of a slice is migrated, its entry in the mapping table 300 for that slice may be updated such that the write unit 304 refers to the unit of storage identifying where the segment is stored in the storage resources of the new computing platform (e.g., physical segment or virtual segment identifier of a cloud computing platform). The manner in which segments are accessed 612 and migrated 614 may be according to the approach described below with respect to FIGS. 7 and 8.

Figure 7:
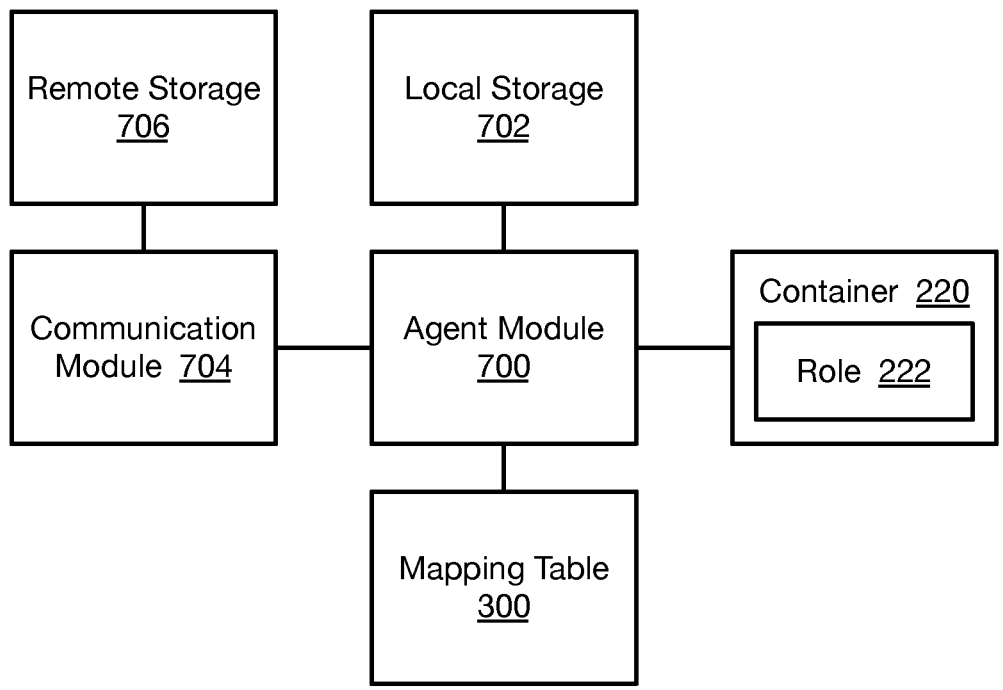
FIG. 7 is a schematic block diagram of components for executing a role of an application in accordance with an embodiment of the present invention.

Referring to FIG. 7, a container 220 executing a role instance 222 may communicate with an agent module 700 executing on the same computing platform as the container 220. For example, where the computing platform is a customer premise, the agent module 700 may execute on the same compute node 110 as the container 220 or on a different compute node 110 or storage node 106 on the customer premise. Where the computing platform is a cloud computing platform, the agent module 700 may execute within a same virtual machine as the container 220 or a different virtual machine, such as the same EC2 instance in an AWS cloud. The agent module 700 may itself execute within a container 220.

The agent module 700 may access the mapping table 300 and likewise be in data communication with storage 702 that is local to the computing platform, i.e. storage nodes 106 for a premise computing platform and cloud storage 116 for a cloud computing platform.

The agent module 700 may likewise be in data communication with a communication module 704 that is in data communication, e.g. via the network 104, with a different computing platform, such as a different premise computing platform or a different cloud computing platform 112. The communication module 704 may be programmed to interface with the different computing platform, e.g. perform authentication, establish a connection, execute remote procedure calls (RPC), and otherwise communicate according to a protocol accepted by the different computing platform. The communication module 704 may be programmed to maintain a connection to the different computing platform in order to be prepared to forward read requests referencing segments stored on the remote storage 706 of the different computing platform. The communication module 704 may maintain a connection with another communication module 704 executing on the different computing platform. The communication module 704 may host or access credentials or other authentication data for authenticating itself with the different computing platforms.

The communication module 704 may be common to multiple containers 220 and to multiple agent modules 700. The communication module 704 may execute within a container 220 on the computing platform. Alternatively, each computing unit (compute node 110, EC2, etc.) of the computing platform may execute an instance of a communication module 704.

Figure 8:
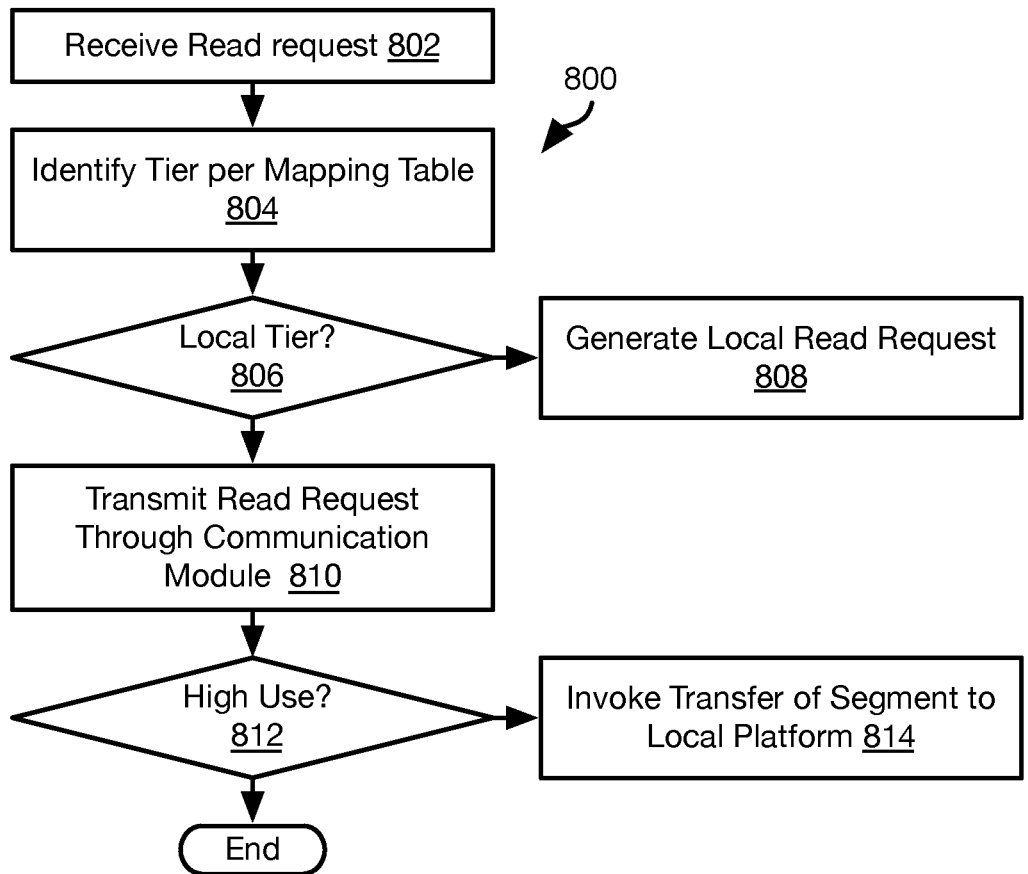
FIG. 8 is a process flow diagram of a method for executing a read request using a mapping table in accordance with an embodiment of the present invention.

FIG. 8 illustrates an example method 800 by which read requests are processed using the system of FIG. 7. The method 800 may include receiving 802, by the agent module 700, a read request from a role instance 222. The read request may include identifiers of a logical storage volume, slice of a storage volume, and LBA within the slice from which data is to be read.

The method 800 may then include identifying 804, by the agent module 700, the tier ID of the computing platform storing the segment with the latest data written to the LBA of the slice and logical storage volume identified by the write request of step 802. For example, the VSID 338 of a segment storing the latest data written to the LBA may be determined from the block map 334 for the logical storage volume and/or slice referenced by the read request. The tier ID on which the segment mapped to that VSID 338 is stored may then be determined from the entry of the mapping table 300 having the VSID field 302 thereof matching the VSID 338.

The method 800 may then include evaluating 806 whether the tier ID identified form step 804 is the local tier, i.e. the computing platform on which the agent module 700 and the container 220 that issued the read request are executing.

If so, the agent module 700 generates 808 a local read request to the local storage 702 to read data corresponding to the LBA from the segment mapped to the VSID identified at step 804. The manner in which data is read from a segment for a given LBA may be performed as described in the incorporated applications. In some embodiments, it may include reading data from the physical segment 312 mapped to the VSID determined from step 804 starting at the data offset 340 in the entry of the block map 334 corresponding to the LBA of the read request. The read data may then be returned to the role instance 222 that generated the read request.

If the tier ID determined at step 804 is determined 806 not to be the local tier, the method 800 may include transmitting 810 the read request to the computing platform corresponding to the tier ID, such as by way of the communication module 704. The read request may be transmitted with an identifier of the segment identified at step 804, such as in the form of a VSID or UUID. The read request may also be transmitted with a data offset 340 indicating the location of the desired data within the segment. The computing platform will then process the read request to retrieve the data corresponding to the LBA of the read request from the segment identified by the VSID or UUID, such as by retrieving the data from the data offset 340 included in the read request. The computing platform will then return the requested data to the agent module 700, such as by way of the communication module 704, which will then return the data to the role instance 222 that generated the read request of step 802.

The method 800 may further include evaluating whether the segment identified at step 804 is a high-use segment. For example, if the number of reads to the segment exceeds a threshold or is higher relative to other segments, then the segment may be identified 812 as high use and the method 800 may include invoking 814 transfer of the segment to the local storage 702 of the local computing platform. This may include updating the mapping table 300 to include the tier ID of the local computing platform in an entry including the VSID or UUID of the segment identified at step 804 and updating the write unit 304 to refer to the storage location of the segment in the local computing platform.

Figure 9:
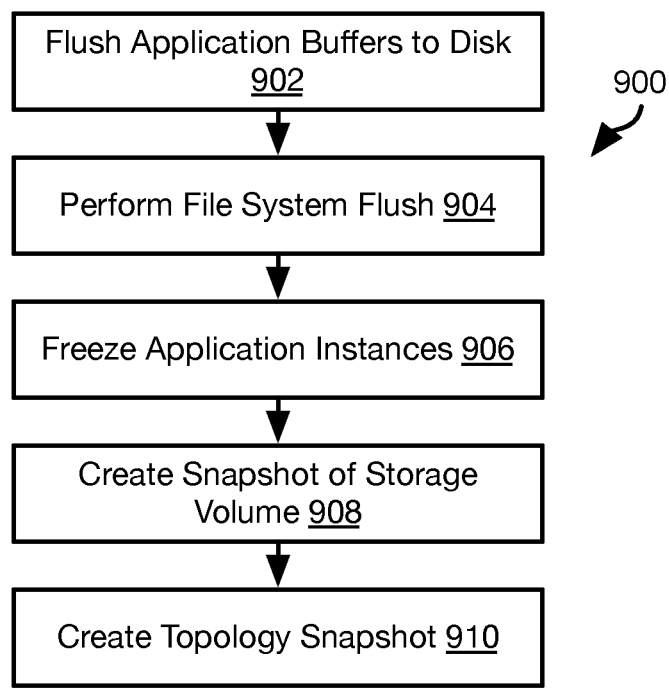
FIG. 9 is a process flow diagram of a method for creating an application snapshot in accordance with an embodiment of the present invention.

Referring to FIG. 9, the illustrated method 900 may be executed by the orchestration layer 200 with respect to a bundled application 202 in order to create a snapshot of the bundled application 200 that can be later restored (see the method 1000 of FIG. 10). As noted above, the method 900 may be executed to create a snapshot of a bundled application 200 in order to transfer the bundled application 200.

The method 900 may include flushing 902 application buffers to disk. In many instances, performance of an application is accelerated by maintaining data in a cache in memory, such that data in the cache is accessed and updated without requiring writing to a disk in many instances, as known in the art. Accordingly, this buffer may be flushed 902 to disk by writing all valid data (i.e., not outdated due to a subsequent write) in the cache to the storage resource (storage device 108 or cloud storage 116) to which that data is addressed, e.g., to which the storage volume and/or slice referenced by the data is assigned.

In a like manner, a file system flush may be performed 904. Performing a file system flush may include ensuring that all IOPs pending to be performed by the file system have been executed, i.e. written to disk. As for step 902, data written to a cache for the file system this is valid may be written to the storage resource (storage device 108 or cloud storage 116) to which the data is addressed, e.g., to which the storage volume and/or slice referenced by the data is assigned.

The method 900 may then include freezing 906 the role instances 222 of each role 212. In particular, inasmuch as each instance 222 is executing within container 220, the containers 220 for the role instances 222 may be instructed to pause execution of each instance 222. This may include stopping execution and saving a state of execution of each instance 222 (state variables, register contents, program pointers, function stack, etc.).

The method 900 may further include creating 908 a snapshot of storage volumes provisioned for the bundled application. This may include any of the approaches for creating a snapshot of a storage volume as described in the incorporated applications.

The method 900 may further include creating 910 a topology snapshot for the bundled application 202. The topology of an application may include some or all of the following information as constituted at the time of executing step 910 a listing of the roles 212, which may include one or more instances 222 of the same role 212, relationships between application instances 222 of roles 212 (name space cross-references, configuration parameters), storage volumes assigned to instance 222 of roles 212, or other information that describes the topology of the bundled application 202. Applications may create metadata describing their state of operation. This data may also be saved as part of the topology snapshot.

After the snapshot is created according to the method 900, the application instances may be resumed, with the application itself not suffering any down time in some embodiments. The bundled application 202 may then continue to operate in some instances. If desired, the application may then be rolled back to the snapshot created according to the method 900, as described below with respect to FIG. 10. When a snapshot is transferred to a new computing platform, the bundled application 202 on the original platform may be stopped either upon creation of the snapshot (e.g., never restarted after creation of snapshot) or when a new instance of the bundled application 202 is ready to be restarted on the new computing platform.

Figure 10:
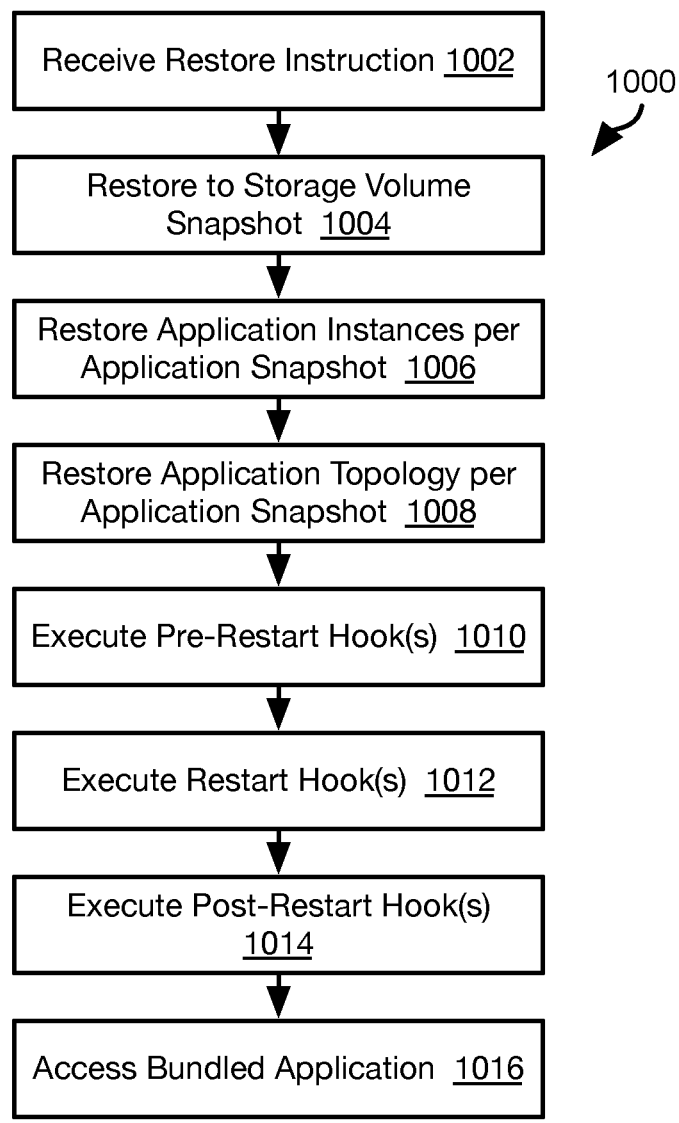
FIG. 10 is a process flow diagram of a method for restoring an application snapshot in accordance with an embodiment of the present invention.

FIG. 10 illustrates a method 1000 for rolling back a bundled application 202 to a snapshot or restoring a snapshot of an application on a new computing platform. The snapshot may be a snapshot created according to the method 900. The method 1000 may be executed by one or both of the orchestration layer 200 and the storage manager 102.

The method 1000 includes receiving 1002 a restore instruction, such as from an administrator desiring to return to a stable version of the bundled application 202 or an administrator transferring the bundled application 202 to a new computing platform as described above with respect to FIGS. 5A to 5E and FIG. 6. The remaining steps of the method 1000 may be executed in response to the restore instruction.

The method 1000 may include rolling 1004 back storage volumes assigned to the bundled application 202 to the snapshots created for the snapshot of the bundled application 202 (e.g., at step 908 of the method 900). Where the application is being transferred such that no further write activity is performed after the snapshots of the storage volumes are created, step 1004 may be omitted.

The method 1000 may include restoring 1006 application instances from the application snapshot. As described above with respect to step 906 of the method 900, a role instance 222 may be frozen. Accordingly, data describing a state of execution of the role instance 222 may be reloaded into a container 220 for that instance. If needed, the container 220 for that role instance 222 may be created and the instance 222 loaded into it prior to loading the state of execution. This is particularly the case where the number of application instances has changed since the application snapshot was created.

The method 1000 may further include restoring 1008 the application topology saved for the bundled application at step 910. Accordingly, relationships between role instances 222 of roles 212 (name space cross-references, configuration parameters), storage volumes assigned to roles 212, or other information that describes the topology of the bundled application 202 may be restored as it was at the time the application snapshot was created The method 1000 further include executing 1010, 1012, 1014 a pre-restart hook, restart hook, and post restart hook defined for the bundled application. As described above, each hook may be a routine defined by a developer to be executed for a particular action, restarting in this case. In step 1012, execution of the instances 222 for the roles 220 may be restarted, along with any other actions specified by the developer in the restart hook.

The bundled application 202 as restored at steps 1004-1014 may then be accessed 1016 as defined by the programming of the application instances and the restored application topology.

Figure 11:
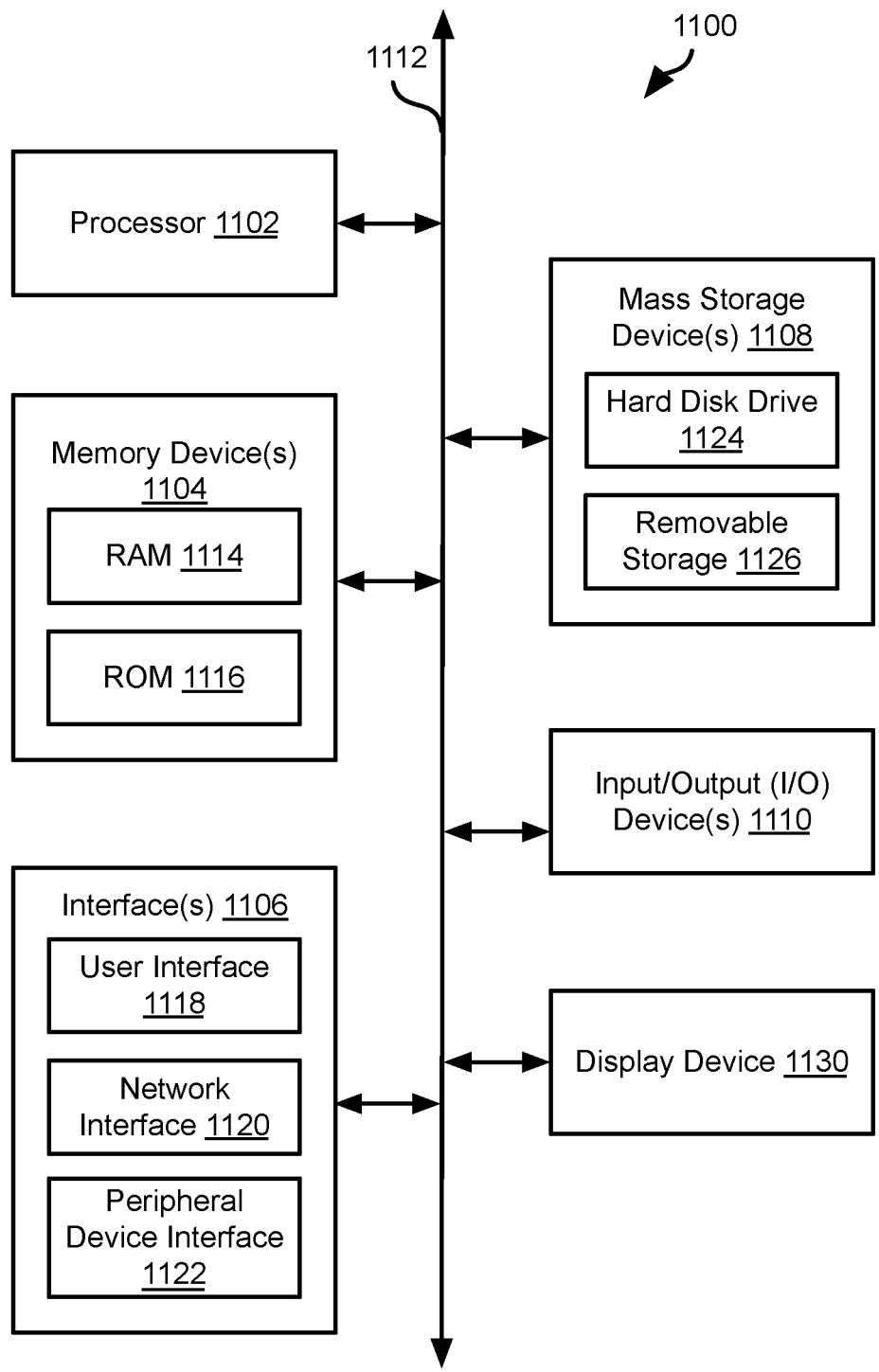
FIG. 11 is a schematic block diagram of an example computing device suitable for implementing methods in accordance with embodiments of the invention.

FIG. 11 is a block diagram illustrating an example computing device 1100. Computing device 1100 may be used to perform various procedures, such as those discussed herein. The storage manager 102, storage nodes 106, and compute nodes 110 may have some or all of the attributes of the computing device 1100. A could computing platform may be made up of computing devices having some or all of the attributes of the computing device 1100.

Computing device 1100 includes one or more processor(s) 1102, one or more memory device(s) 1104, one or more interface(s) 1106, one or more mass storage device(s) 1108, one or more Input/output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, I/O device(s) 1110, and display device 1130 to communicate with one another, as well as other devices or components coupled to bus 1112. Bus 1112 represents one or more of several types of bus structures, such as a system bus, PCI bus, IEEE 1194 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

executing a first instance of an application on a first tier of a plurality of tiers, each tier of the plurality of tiers including computing resources and storage resources, the computing resources of the first tier executing the first instance of the application;

maintaining, by module executed by one of the plurality of tiers, a mapping table that maps segments of a logical volume written to by the first instance of the application to a tier of the plurality of tiers, a first portion of the segments of the logical volume being stored in the storage resources of the first tier and the mapping table being stored in the storage resources of the first tier;

accessing, by the application, the segments of the logical volume using the mapping table;

instantiating a second instance of the application on a second tier of the plurality of tiers that is different from the first tier;

transferring the mapping table from the storage resources of the first tier to the storage resources of the second tier;

commencing executing of the second instance of the application effective to access the segments of the logical volume, including the first portion of the segments, using the mapping table without first copying the first portion of the segments to the storage resources of the second tier.

2. The method of claim 1, wherein executing the first instance of the application in the first tier comprises executing instances of a plurality of roles of the first instance in containers executing on the computing resources of the first tier.

3. The method of claim 2, wherein the computing resources of the first tier comprise a plurality of computing devices.

4. The method of claim 3, wherein the storage resources of the first tier comprise storage devices mounted to the plurality of computing devices.

5. The method of claim 4, wherein the second tier is a cloud computing platform, the computing resources of the second tier are virtualized computing resources, and the storage resources of the second tier are virtualized storage resources.

6. The method of claim 1, wherein the first tier and the second tier are different cloud computing platforms, the computing resources of the first tier and the second tier being virtualized computing resources, and the storage resources of the first tier and the second tier being virtualized storage resources.

7. The method of claim 1, further comprising:
following commencing executing the second instance of the application, transferring the first portion of the segments to the storage resources of the second tier; and
updating the mapping table to map the first portion of the segments to the second tier.

8. The method of claim 7, further comprising transferring the first portion of the segments to the storage resources in response to usage of the first portion of the segments.

9. The method of claim 1, further comprising:
capturing a snapshot of a state of the first instance of the application; and
configuring the state of the second instance of the application according to the snapshot.

10. The method of claim 9, wherein the state of the first instance of the application includes states of a plurality of roles of the application.

11. The method of claim 10, wherein the state of the first instance of the application includes a topology of a plurality of roles of the application.

12. The method of claim 9, further comprising:
capturing a snapshot of the logical storage volume; and
mounting the snapshot of the logical storage volume to the second instance of the application.

13. A system comprising:
a first computing platform including a plurality of computing resources and storage resources implemented by a plurality of computing devices;
wherein the first computing platform is programmed to:
restore a second instance of a bundled application on the first computing platform from a snapshot of a first instance of the bundled application, the snapshot of the first instance of the bundled application being received from a second computing platform remote from the first computing platform;
receive a mapping table for the first instance of the bundled application from the second computing platform, the mapping table mapping segments of a logical volume written to the first instance of the bundled application, the segments being stored in storage resources of the second computing platform;
commence executing of the second instance of the bundled application effective to access the segments of the logical volume using the mapping table without first copying the segments to storage resources of the first computing platform.

14. The system of claim 13, wherein first computing platform is programmed to execute the second instance of the bundled application by executing instances of a plurality of roles of the second instance of the bundled application in containers executing on computing resources of the first computing platform.

15. The system of claim 14, wherein the first computing platform is a cloud computing platform, the computing resources of the first computing platform being virtualized computing resources.

16. The system of claim 14, wherein the storage resources of the first computing platform are virtualized storage resources.

17. The system of claim 13, wherein the first computing platform is further programmed to:
following commencing executing the second instance of the bundled application, transfer the segments to storage resources of the first computing platform; and
update the mapping table to map the segments to the first computing platform.

18. The system of claim 13, wherein the snapshot of the first instance of the application includes a topology of a plurality of roles of the application.

19. The system of claim 18, wherein the first computing platform is further programmed to invoke transfer the segments to the storage resources in response to usage of the segments.

20. The system of claim 18, wherein the first computing platform is further programmed to restore the second instance of the bundled application on the first computing platform from the snapshot of a first instance of the bundled application by:
instantiating containers executing instances of roles of the application according to the topology.

* * * * *